United States Patent
Kang et al.

(10) Patent No.: US 11,005,294 B2
(45) Date of Patent: May 11, 2021

(54) WIRELESS POWER TRANSMITTER, WIRELESS POWER RECEIVER, AND OPERATING METHOD THEREOF

(71) Applicant: Samsung Electronics Co., Ltd., Gyeonggi-do (KR)

(72) Inventors: Min-Ho Kang, Gyeonggi-do (KR); Saeng-Hee Lee, Gyeonggi-do (KR); Han-Seok Park, Seoul (KR); Se-Ho Park, Gyeonggi-do (KR); Kyung-Woo Lee, Seoul (KR)

(73) Assignee: Samsung Electronics Co., Ltd

( * ) Notice: Subject to any disclaimer, the term of this patent is extended or adjusted under 35 U.S.C. 154(b) by 379 days.

(21) Appl. No.: 15/478,990

(22) Filed: Apr. 4, 2017

(65) Prior Publication Data
US 2017/0324279 A1 Nov. 9, 2017

(30) Foreign Application Priority Data

May 4, 2016 (KR) .................. 10-2016-0055745

(51) Int. Cl.
*H02J 50/12* (2016.01)
*H02J 50/80* (2016.01)
*H02J 7/02* (2016.01)
*H02J 7/00* (2006.01)

(52) U.S. Cl.
CPC .............. *H02J 50/12* (2016.02); *H02J 7/025* (2013.01); *H02J 50/80* (2016.02); *H02J 7/00045* (2020.01)

(58) Field of Classification Search
None
See application file for complete search history.

(56) References Cited

U.S. PATENT DOCUMENTS

| | | | | |
|---|---|---|---|---|
| 2013/0063082 A1* | 3/2013 | Lee | ............... | H02J 50/80 320/108 |
| 2013/0154557 A1* | 6/2013 | Lee | ............... | H04B 5/0037 320/108 |
| 2013/0181665 A1* | 7/2013 | Lee | ............... | H02J 50/40 320/108 |
| 2013/0234661 A1* | 9/2013 | Yang | ............... | H02J 50/12 320/108 |
| 2014/0327319 A1* | 11/2014 | Byun | ............... | H04W 76/14 307/104 |
| 2016/0359375 A1* | 12/2016 | Lee | ............... | H02J 50/40 |

FOREIGN PATENT DOCUMENTS

| KR | 1020140087526 | 7/2014 |
|---|---|---|
| KR | 1020150099382 | 8/2015 |
| KR | 1020150125525 | 11/2015 |

* cited by examiner

*Primary Examiner* — Daniel Kessie
(74) *Attorney, Agent, or Firm* — The Farrell Law Firm, P.C.

(57) ABSTRACT

Provided is a wireless power receiver for wirelessly receiving power from a wireless power transmitter, including a resonator that wirelessly receives power from the wireless power transmitter, a communication module that performs communication with the wireless power transmitter, and a controller that transmits manufacturer information on the wireless power receiver to the wireless power transmitter through the communication module, receives an authority over whether to allow each of at least one function of the wireless power receiver through the communication module, and performs a function allowed for the wireless power receiver based on the authority.

9 Claims, 28 Drawing Sheets

WIRELESS POWER TRANSMITTER, WIRELESS POWER RECEIVER, AND OPERATING METHOD THEREOF

PRIORITY

This application claims priority under 35 U.S.C. § 119(a) to a Korean Patent Application which was filed in the Korean Intellectual Property Office on May 4, 2016 and assigned Serial No. 10-2016-0055745, the contents of which are incorporated herein by reference.

BACKGROUND

1. Field of the Disclosure

The present disclosure relates generally to a wireless power transmitter, a wireless power receiver, and operating methods thereof, and more particularly, to a wireless power transmitter, a wireless power receiver, and operating methods thereof that are capable of performing communication in a predetermined scheme.

2. Description of the Related Art

Mobile terminals, such as portable phones or personal digital assistants (PDAs), are generally powered by rechargeable batteries that are charged using separate chargers. The charger and the battery each have an exterior contact terminal and are thus electrically connected to each other via their contact terminals.

This contact-based charging scheme incurs a problem in which the contact terminals are vulnerable to contamination by foreign materials, resulting in unreliable battery charging because the contact terminals protrude outward. Moreover, if the contact terminals are exposed to moisture, the batteries may not be charged properly.

To address these problems, wireless charging or contactless charging technologies have recently been developed and applied to many electronic devices.

Such a wireless charging technology is based on wireless power transmission and reception. For example, once a portable phone including a battery is placed on a charging pad without being connected to an additional charging connector, the battery is automatically charged. Wireless electric toothbrushes and shavers are well known examples of such wirelessly charged products. The wireless charging technology offers the benefits of increased waterproofing of electronic products and enhanced portability due to lack of need for a wired charger. It is also anticipated that various relevant wireless charging technologies will be further developed in the coming era of electric vehicles.

Wireless charging schemes mainly include electromagnetic induction using coils, resonance-based charging, and radio frequency (RF)/microwave radiation based on conversion of electrical energy to microwaves.

To date, the electromagnetic induction-based wireless charging scheme has been most popular. However, considering recent successful experiments in wireless power transmission over microwaves at a distance of tens of meters in Korea and other countries, it is foreseeable that every electronic product will be charged wirelessly at any time or place in the near future.

Electromagnetic induction-based power transmission refers to power transfer between primary and secondary coils. When a magnet moves through a coil, a current is induced in the coil. Based on this principle, a transmitter creates a magnetic field and a receiver produces energy by a current induced by a change in the magnetic field, in a phenomenon referred to as magnetic induction. Power transmission based on magnetic induction is highly efficient for energy transfer.

In 2005, regarding resonance-based wireless charging, a system that makes wireless electricity transfer from a charger at a distance of a few meters based on the resonance-based power transmission principle by the coupled mode theory was developed. This wireless charging system by the MIT team is based on a physics concept of resonance in which an oscillating tuning fork placed next to a wineglass will cause the wine glass to oscillate at the same frequency as the tuning fork. The research team resonated electromagnetic waves carrying electric energy, instead of sound. The resonant electrical energy is directly transferred only in the presence of a device having the same resonant frequency, while the unused electric energy is reabsorbed into the electromagnetic field rather than being transmitted to the air. Thus, the resonant electrical energy does not affect nearby machines or human bodies, as compared to other electromagnetic waves.

Wireless charging is a recent area of active research. However, there are no specified standards of wireless charging priority, detection of a wireless power transmitter/receiver, communication frequency selection between a wireless power transmitter and a wireless power receiver, wireless power control, selection of a matching circuit, and allocation of a communication time to each wireless power receiver in a single charging cycle. Particularly, there exists a need for developing standards for a configuration and procedures that allow a wireless power receiver to select a wireless power transmitter from which to receive wireless power.

A wireless power transmitter and receiver may communicate with each other in a predetermined communication scheme, such as Bluetooth low energy (BLE). Such an out-of-band scheme as BLE increases an available communication distance. Accordingly, the wireless power transmitter and receiver may communicate even if they are a relatively large distance away from each other. That is, even if the wireless power transmitter is too far to transmit power wirelessly, the wireless power transmitter may communicate with the wireless power receiver.

Conventionally, a wireless power transmitter does not identify manufacturer information on a wireless power receiver, and the wireless power receiver does not identify manufacturer information on the wireless power transmitter. Accordingly, it is impossible to implement manufacturer-specific services, thereby causing compatibility problems. In particular, when the conventional wireless power transmitter and receiver perform communication based on BLE, the wireless power receiver as a slave node is unable to actively provide a service, which is an inconvenience to the user.

As such, there is a need in the art for a method and apparatus for identifying manufacturer information in such wireless power transmitters and receivers.

SUMMARY

The present disclosure has been made to address the above-mentioned problems and disadvantages, and to provide at least the advantages described below.

Accordingly, an aspect of the present disclosure is to provide a wireless power transmitter, a wireless power receiver, and operating methods of the wireless power transmitter and receiver that are capable of identifying counterpart manufacturer information.

According to an aspect of the present disclosure, a wireless power receiver for wirelessly receiving power from a wireless power transmitter may include a resonator that wirelessly receives power from the wireless power transmitter, a communication module that performs communication with the wireless power transmitter, and a controller transmits manufacturer information on the wireless power receiver to the wireless power transmitter through the communication module, receives authority over whether to allow each of at least one function of the wireless power receiver to be performed through the communication module, and performs a function allowed for the wireless power receiver based on the authority.

According to another aspect of the present disclosure, a wireless power transmitter for wirelessly transmitting power to a wireless power receiver may include a resonator that wirelessly transmits power to the wireless power receiver, a communication module that performs communication with the wireless power receiver, and a controller that receives manufacturer information on the wireless power receiver from the wireless power receiver through the communication module, determines whether to allow each of at least one function of the wireless power receiver to be performed based on the manufacturer information on the wireless power receiver, and transmits an authority over whether to allow each of the at least one function of the wireless power receiver to the wireless power receiver through the communication module.

According to another aspect of the present disclosure, an operating method of a wireless power receiver for wirelessly receiving power from a wireless power transmitter may include transmitting an advertisement signal, receiving a connection request signal corresponding to the advertisement signal, and transmitting a power receiving unit static parameter signal including manufacturer information on the wireless power receiver in response to the connection request signal.

According to another aspect of the present disclosure, an operating method of a wireless power transmitter for wirelessly transmitting power from a wireless power receiver may include detecting a load change of a resonator of the wireless power transmitter, which is caused by a disposition of the wireless power receiver, receiving an advertisement signal, transmitting a connection request signal corresponding to the advertisement signal in response to the detection of the load change and receipt of the advertisement signal, and receiving a power receiving unit static parameter signal including manufacturer information on the wireless power receiver corresponding to the connection request signal.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
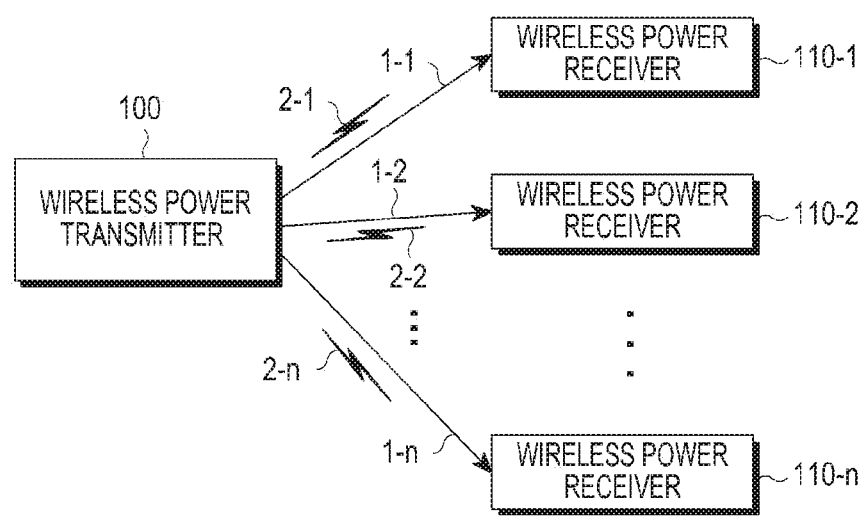
FIG. 1 is a conceptual view illustrating an overall operation of a wireless charging system according to embodiments of the present disclosure.

Hereinafter, embodiments of the present disclosure will be described more specifically with reference to the accompanying drawings. It should be noted that the same components of the drawings are designated by the same reference numeral anywhere. In the following description of the present disclosure, a detailed description of known functions and configurations incorporated herein will be omitted for the sake of clarity and conciseness.

A concept of a wireless charging system that is applicable to an embodiment of the present disclosure is described with reference to FIG. 1 to FIG. 11, and a wireless power transmitter according to embodiments of the present disclosure will be described in detail with reference to FIG. 12A to FIG. 19.

FIG. 1 is a conceptual view illustrating an overall operation of a wireless charging system according to embodiments of the present disclosure. As illustrated in FIG. 1, the wireless charging system includes a wireless power transmitter 100 and at least one wireless power receivers 110-1, 110-2, and 110-n.

The wireless power transmitter 100 may wirelessly transmit power 1-1, 1-2, and 1-n to the at least one wireless power receivers 110-1, 110-2, and 110-n authenticated via a pre-determined authentication procedure.

The wireless power transmitter 100 may form an electrical connection to the wireless power receivers 110-1, 110-2, and 110-n. For example, the wireless power transmitter 100 may transmit wireless power in an electromagnetic wave form to the wireless power receivers 110-1, 110-2, and 110-n.

The wireless power transmitter 100 may perform two-way communication with the wireless power receivers 110-1, 110-2, and 110-n by which the wireless power transmitter 100 and the wireless power receivers 110-1, 110-2, and 110-n may process or transmit/receive a packet 2-1, 2-2, and 2-n including a predetermined frame. The frame will be described in detail later. The wireless power receiver may be provided, for example, as a mobile communication terminal, a personal digital assistant (PDA), a portable multimedia player (PMP), or a smartphone.

The wireless power transmitter 100 may wirelessly provide power to a plurality of wireless power receivers 110-1, 110-2, and 110-n, such as by using a resonance method. When the wireless power transmitter 100 employs the resonance method, the distance between the wireless power transmitter 100 and the plurality of wireless power receivers 110-1, 110-2, and 110-n may be preferably 30 m or less. When the wireless power transmitter 100 employs an electromagnetic induction method, the distance between the wireless power transmitter 100 and the plurality of wireless power receivers 110-1, 110-2, and 110-n may be preferably 10 cm or less.

The wireless power receivers 110-1, 110-2, and 110-n may receive wireless power from the wireless power transmitter 100 to charge an internally provided battery, and may transmit a signal for requesting wireless power transmission, information necessary for wireless power reception, wireless power receiver state information, or control information on the wireless power transmitter 100 to the wireless power transmitter 100. Information on the transmitted signal will be described in detail later herein.

The wireless power receivers 110-1, 110-2, and 110-n may transmit a message indicating each charging state to the wireless power transmitter 100, which may include a display that displays states of the respective wireless power receivers 110-1, 110-2, and 110-n based on the messages received from the respective wireless power receivers 110-1, 110-2, and 110-n. In addition, the wireless power transmitter 100 may also display the estimated time to complete charging the wireless power receivers 110-1, 110-2, and 110-n.

The wireless power transmitter 100 may transmit a control signal to disable a wireless charging function to each of the wireless power receivers 110-1, 110-2, and 110-n. When the control signal to disable the wireless charging function is received from the wireless power transmitter 100, the wireless power receivers may disable the wireless charging function.

Figure 2:
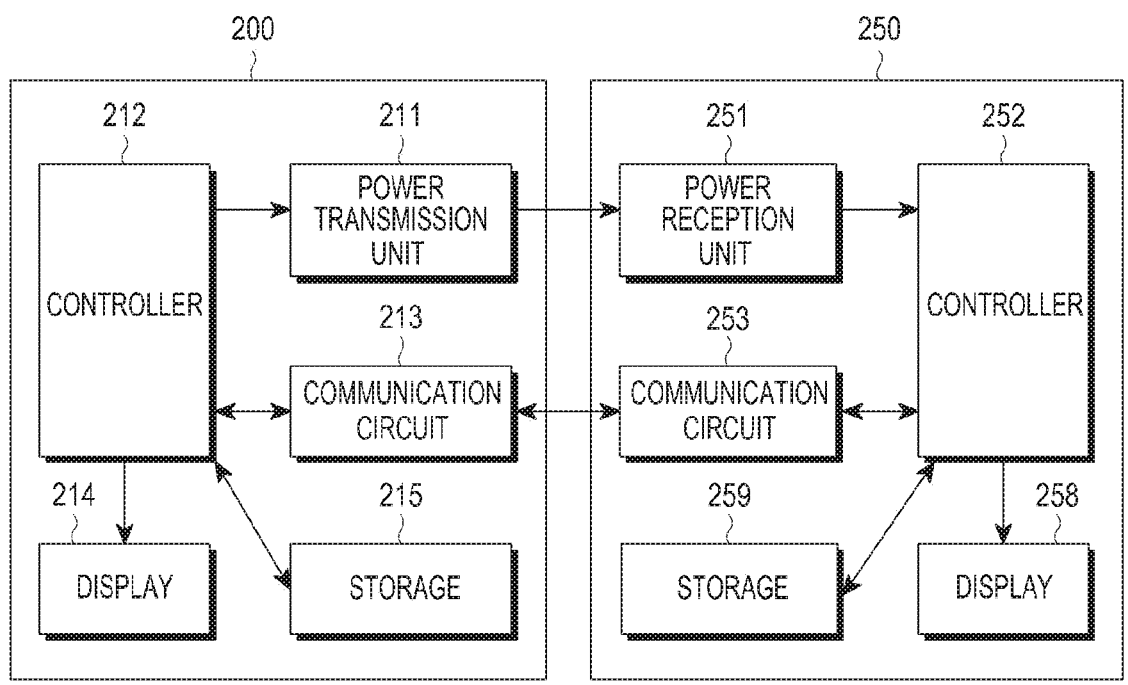
FIG. 2 illustrates a wireless power transmitter and a wireless power receiver according to an embodiment of the present disclosure.

FIG. 2 illustrates a wireless power transmitter and a wireless power receiver according to an embodiment of the present disclosure.

As illustrated in FIG. 2, the wireless power transmitter 200 may include at least one of a power transmission unit 211, a controller 212, a communication circuit 213, a display 214, and a storage 215.

The power transmission unit 211 may supply power required by the wireless power transmitter 200 and may wirelessly supply power to the wireless power receiver 250. The power transmission unit 211 may supply power in an alternating current (AC) waveform and may convert power of a direct current (DC) waveform into power of an AC waveform using an inverter to supply the power of the AC waveform. The power transmission unit 211 may be provided in the form of a built-in battery or may be provided in the form of a power receiving interface that receives power from the outside to supply power to another component. As would be readily understood by those skilled in the art, the power transmission unit 211 may be any means that is capable of providing power of an AC waveform without limitation.

The controller 212 may control overall operations of the wireless power transmitter 200 using an algorithm, a program, or an application required for control, which is readable from the storage 215. The controller 212 may be provided as a central processing unit (CPU), a microprocessor, or a minicomputer. Accordingly, the controller 212 may be referred to as a controller, or as a micro controlling unit (MCU) depending on a configuration.

The communication circuit 213 may communicate with the wireless power receiver 250 using a predetermined scheme. The communication circuit 213 may receive power information from the wireless power receiver 250. The power information may include at least one of the capacity, the residual battery amount, the charging numbers, the usage, the battery capacity, and the battery percentage of the wireless power receiver 250.

The communication circuit 213 may transmit a charging function control signal to control a charging function of the wireless power receiver 250. The charging function control signal may be a control signal that controls a power reception unit 251 of a specific wireless power receiver 250 to enable or disable a charging function. Although described in detail later, the power information may include information on the insertion of a wired charging terminal, a switch from a stand alone (SA) mode to a non-stand alone (NSA) mode, and error condition clearing. The charging function control signal may be information associated with cross connection determination, such as identification information and setting information for cross connection determination, and may include pattern or time information associated with a load change of the wireless power receiver 250 for cross connection determination.

The communication circuit 213 may receive a signal from both the wireless power receiver 250 and from another wireless power transmitter.

The controller 212 may display a state of the wireless power receiver 250 on the display 214 based on a message received from the wireless power receiver 250 through the communication circuit 213, and may display the estimated time to complete charging the wireless power receiver 250 on the display 214.

As illustrated in FIG. 2, the wireless power receiver 250 may include at least one of a power reception unit 251, a controller 252, a communication circuit 253, a display 258, and a storage 259.

The power reception unit 251 may wirelessly receive power transmitted from the wireless power transmitter 200. The power reception unit 251 may receive power in an AC waveform.

The controller 252 may control overall operations of the wireless power receiver 250 using an algorithm, a program, or an application required for control, which is readable from the storage 259, and may be provided as a CPU, a microprocessor, or a minicomputer.

The communication circuit 253 may communicate with the wireless power transmitter 200 using a predetermined scheme, and may transmit power information to the wireless power transmitter 200, including at least one of the capacity, the residual battery amount, the charging numbers, the usage, the battery capacity, and the battery percentage of the wireless power receiver 250.

The communication circuit 253 may receive a charging function control signal to control a charging function of the wireless power receiver 250, such as a control signal that controls a power reception unit 251 of a specific wireless power receiver 250 to enable or disable a charging function. As will be described in detail later herein, the power information may include information on the insertion of a charging cable terminal, a switch from an SA mode to an NSA mode, and error condition clearing. The charging function control signal may be information associated with cross connection determination, such as identification information and setting information for cross connection determination, and may include pattern or time information associated with a load change of the wireless power receiver 250 for cross connection determination.

The controller 252 may control the display 258 to display a state of the wireless power receiver 250, and to display the estimated time to complete charging the wireless power receiver 250 on the display 258.

Figure 3:
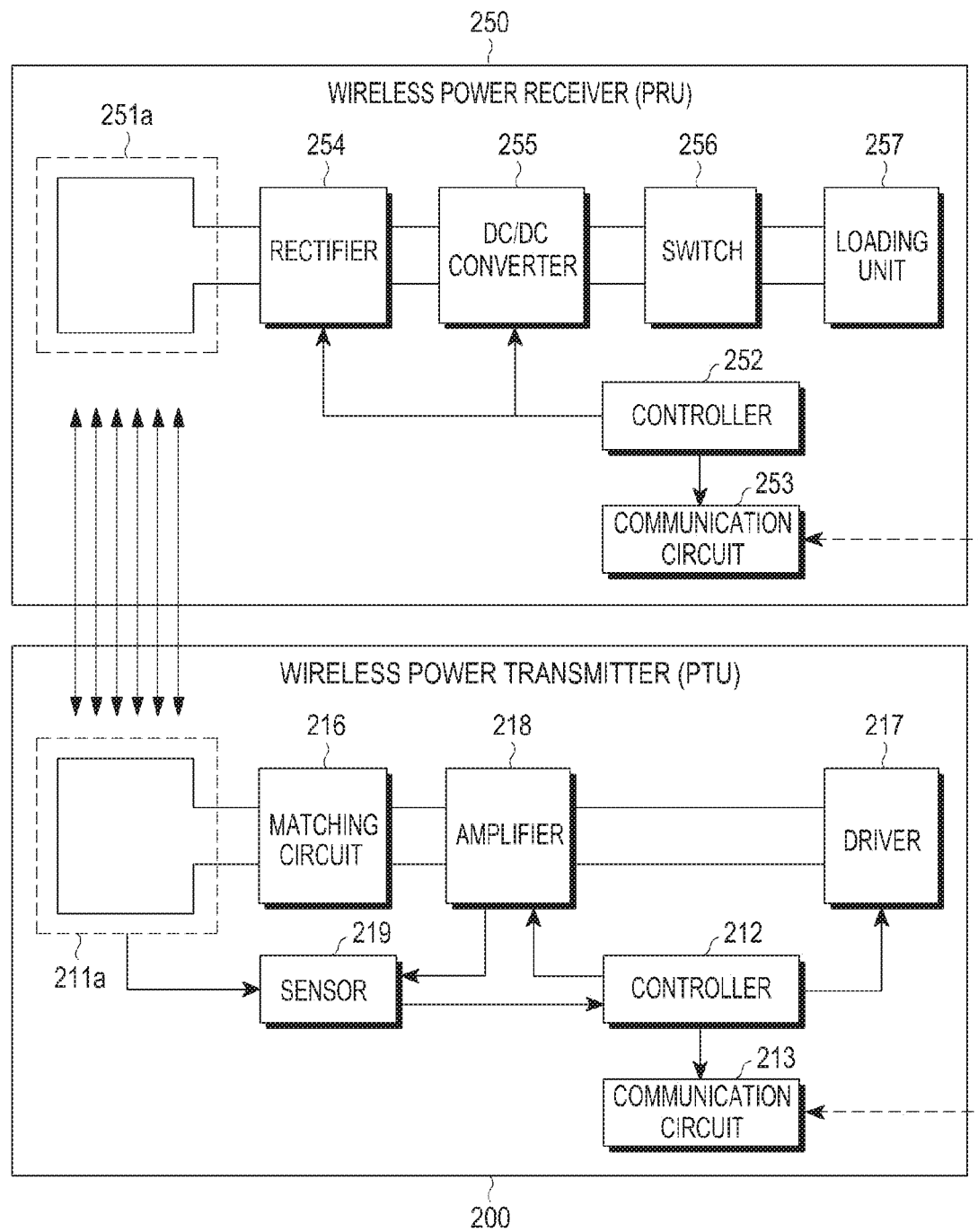
FIG. 3 illustrates the wireless power transmitter and the wireless power receiver according to an embodiment of the present disclosure.

FIG. 3 illustrates the wireless power transmitter and the wireless power receiver according to an embodiment of the present disclosure.

As illustrated in FIG. 3, the wireless power transmitter 200 may include at least one of a transmission resonator (Tx resonator) 211a, a controller 212, such as a multipoint control unit (MCU), a communication circuit 213, such as an out-of-band signaling unit, a driver (power supply) 217, an amplifier (power amp) 218, a matching unit (matching circuit) 216, and a sensor 219. The wireless power receiver 250 may include at least one of a reception resonator (Rx resonator) 251a, a controller 252, a communication circuit 253, a rectifier 254, a DC/DC converter 255, a switch 256, and a loading unit (client device load) 257.

The driver 217 may output DC power with a preset voltage value that may be controlled by the controller 212.

A DC current output from the driver 217 may be output to the amplifier 218. The amplifier 218 may amplify the DC current into a preset gain, and may convert DC power into AC power based on a signal input from the controller 212. Accordingly, the amplifier 218 may output AC power.

The matching unit 216 may perform impedance matching. For example, the matching unit 216 may adjust the impedance viewed from the matching unit 216 to control the output power to have a high efficiency or high output. The sensor 219 may sense a load change of the wireless power receiver 250 through the Tx resonator 211a or the amplifier 218 and may provide a sensing result to the controller 212.

The matching unit 216 may adjust the impedance under control of the controller 212. The matching unit 216 may include at least one of a coil and a capacitor. The controller 212 may control a state of a connection to at least one of the coil and the capacitor, and the matching unit 216 may perform impedance matching accordingly.

The Tx resonator 211a may transmit input AC power to the Rx resonator 251a. The Tx resonator 211a and the Rx resonator 251a may be configured as resonance circuits having the same resonance frequency, such as 6.78 MHz. In one embodiment, an inverter may convert DC power from the driver 217 into AC power and may output AC power to the Tx resonator 211a.

The communication circuit 213 may communicate with the communication circuit 253 of the wireless power receiver 250, for example, bi-directionally in 2.4 GHz (by wireless fidelity (WiFi), ZigBee, or Bluetooth (BT)/BLE).

The Rx resonator 251a may receive power for charging.

The rectifier 254 may rectify wireless power received from the Rx resonator 251a into DC power and may be configured, for example, as a bridge diode. The DC/DC converter 255 may convert the rectified power into a preset gain, such as the voltage at the output end being 5 V. A minimum voltage value and a maximum voltage value that may be applied to the input end of the DC/DC converter 255 may be preset.

The switch 256 may connect the DC/DC converter 255 to the loading unit 257, and may be kept in an on or off state according to control by the controller 252. The switch 256 may be omitted. When the switch 256 is in the on state, the loading unit 257 may store converted power input from the DC/DC converter 255.

Figure 4:
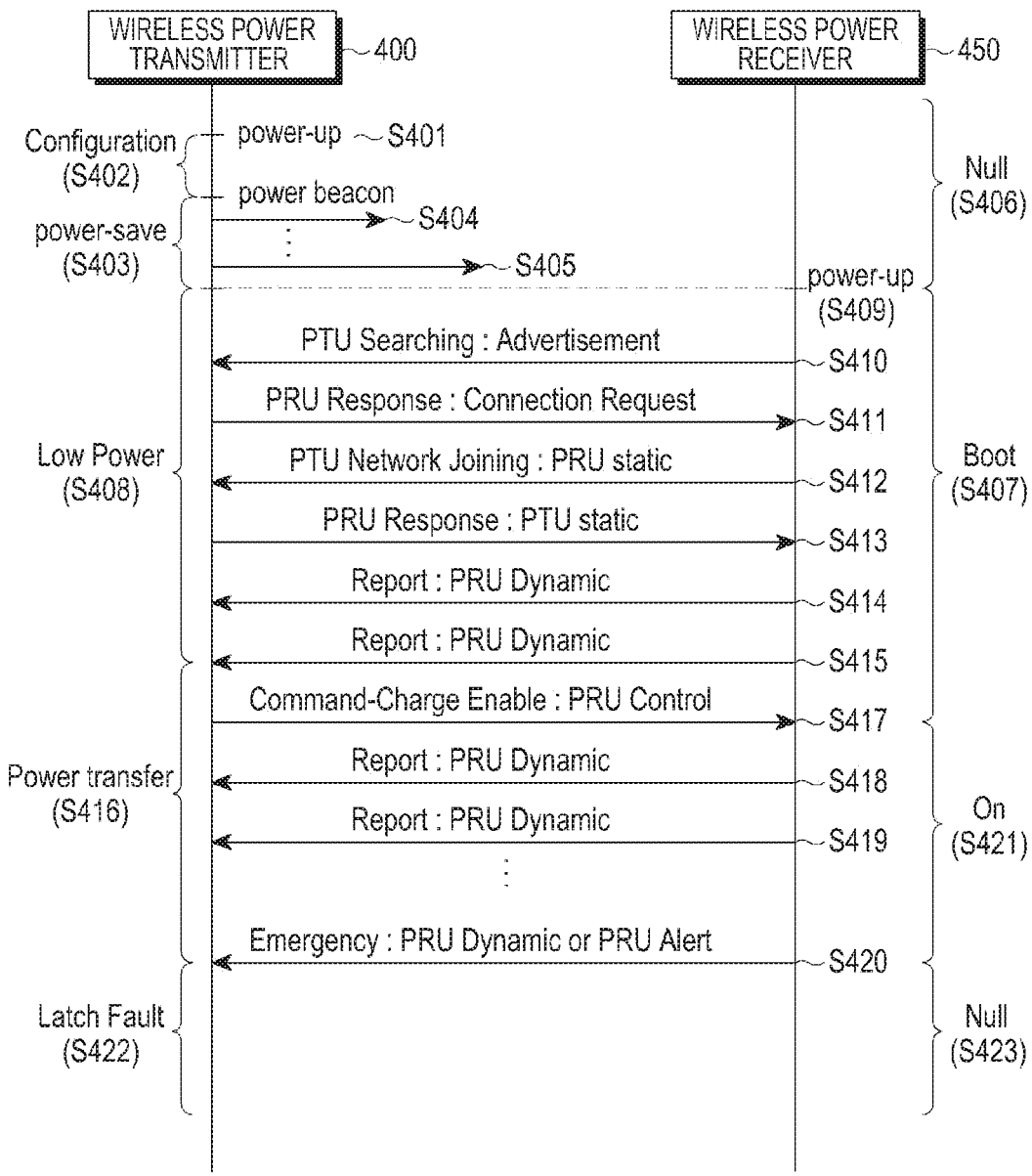
FIG. 4 illustrates operations of a wireless power transmitter and a wireless power receiver according to an embodiment of the present disclosure.

FIG. 4 illustrates operations of a wireless power transmitter and a wireless power receiver according to an embodiment of the present disclosure. As illustrated in FIG. 4, the wireless power transmitter 400 may be powered up in step S401. When powered up, the wireless power transmitter 400 may configure an environment in step S402.

Figure 6:
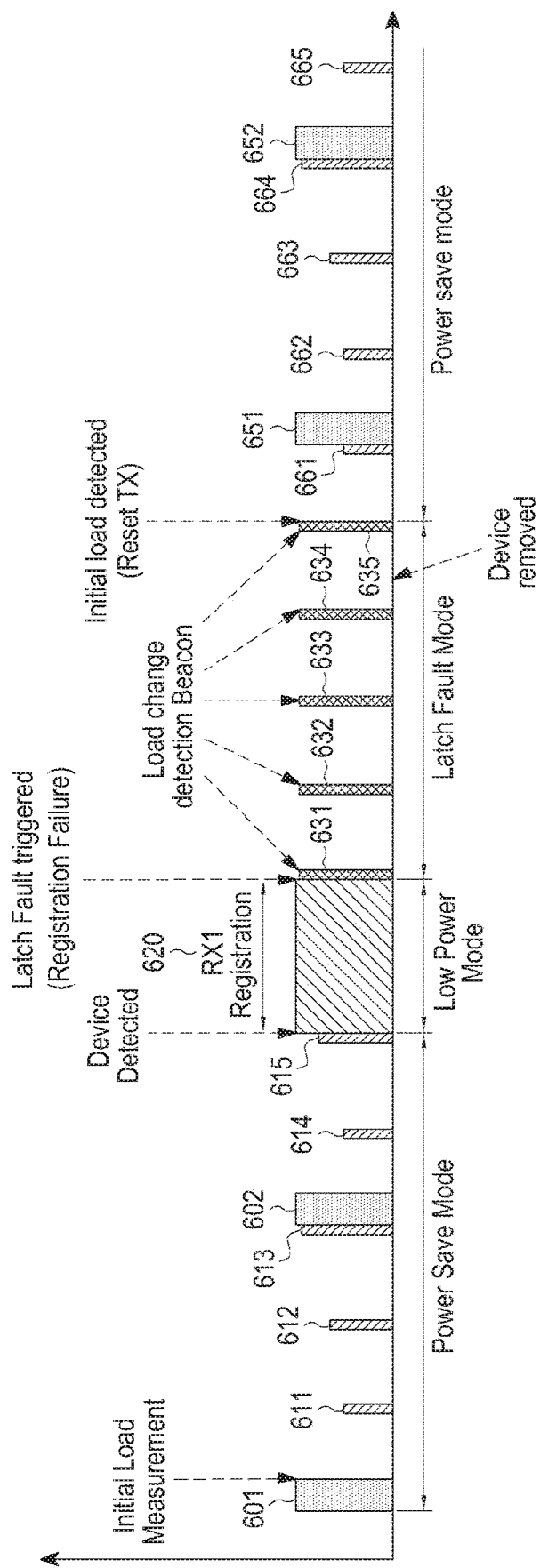
FIG. 6 illustrates power applied by the wireless power transmitter with respect to a time axis.

The wireless power transmitter 400 may enter a power save mode in step S403, in which the wireless power transmitter 400 may apply different types of power beacons for detection, with respective periods thereof, which will be described in detail with reference to FIG. 6. For example, as illustrated in FIG. 4, the wireless power transmitter 400 may apply power beacons in step S404 and S405, for detection, wherein the power beacons n may have different power values, respectively. Part or all of the power beacons in steps S404 and S405 for detection may have enough power to drive a communication circuit of a wireless power receiver 450. For example, the wireless power receiver 450 may communicate with the wireless power transmitter 400 by driving the communication circuit using part or all of the power beacons in steps S404 and S405 for detection, in what is referred to as a null state in step S406.

The wireless power transmitter 400 may detect a load change caused by a disposition of the wireless power receiver 450. The wireless power transmitter 400 may enter a low power mode in step S408. The low power mode will also be described in detail with reference to FIG. 6. The wireless power receiver 450 may drive the communication circuit based on power received from the wireless power transmitter 400 in step S409.

The wireless power receiver 450 may transmit a power transmitting unit (PTU) searching signal to the wireless power transmitter 400 in step S410, using a BLE-based advertisement (AD) signal. The wireless power receiver 450 may periodically transmit the PTU searching signal until the wireless power receiver 450 receives a response signal from the wireless power transmitter 400 or a preset time period elapses.

Upon receiving the PTU searching signal from the wireless power receiver 450, the wireless power transmitter 400 may transmit a power receiving unit (PRU) response signal in step S411, which may form a connection between the wireless power transmitter 400 and a wireless power receiver 450.

The wireless power receiver 450 may transmit a PRU static signal in step S412. The PRU static signal may indicate a state of the wireless power receiver 450 and may request joining a wireless power network managed by the wireless power transmitter 400. The wireless power transmitter 400 may transmit a PTU static signal, in step S413, which may indicate a capability of the wireless power transmitter 400.

When the wireless power transmitter 400 and the wireless power receiver 450 transmit and receive the PRU static signal and the PTU static signal, the wireless power receiver 450 may periodically transmit a PRU dynamic signal in steps S414 and S415. The PRU dynamic signal may include at least one parameter information measured by the wireless power receiver 450. For example, the PRU dynamic signal may include information on a voltage at the output end of a rectifier of the wireless power receiver 450, in what may be referred to as a boot state in step S407.

The wireless power transmitter 400 enters the power transfer mode in step S416 and may transmit a PRU control signal as a command signal to instruct the wireless power receiver 450 to perform charging in step S417. In the power transfer mode, the wireless power transmitter 400 may transmit charging power.

The PRU control signal transmitted by the wireless power transmitter 400 may include information that enables/disables charging of the wireless power receiver 450 and permission information. The PRU control signal may be transmitted each time a charging state is changed, such as every 250 ms or upon the occurrence of a parameter change. The PRU control signal may also be configured to be transmitted within a preset threshold time, for example, within 1 second, even though no parameter is changed. The wireless power receiver 450 may change a setting according to the PRU control signal and may transmit a PRU dynamic signal to report a state of the wireless power receiver 450 in steps S418 and S419. The PRU dynamic signal transmitted by the wireless power receiver 450 may include information on at least one of a voltage, a current, a wireless power receiver state, and a temperature. This state of the wireless power receiver 450 may be referred to as an on state.

The PRU dynamic signal may have a data structure as illustrated in Table 1, as follows.

TABLE 1

| Field | octets | description | use | units |
|---|---|---|---|---|
| optional fields | 1 | defines which optional fields are populated | mandatory | |
| Vrect | 2 | DC voltage at the output of the rectifier. | mandatory | mV |
| Irect | 2 | DC current at output of the rectifier. | mandatory | mA |
| Vout | 2 | voltage at charge/battery port | optional | mV |
| Iout | 2 | current at the charge/batttery port | optional | mA |
| temperature | 1 | temperature of PRU | optional | Deg C. from −40 C. |
| Vrect min dyn | 2 | The current dynamic minimum rectifier voltage desired | optional | mV |
| Vrect set dyn | 2 | desired Vrect (dynamic value) | optional | mV |
| Vrect high dyn | 2 | The current dynamic maximum rectifier voltage desired | optional | mV |
| PRU alert | 1 | warnings | mandatory | Bit field |
| RFU | 3 | undefined | | |

As illustrated in Table 1, the PRU dynamic signal may include at least one field. Respective fields may provide optional field information, information on a voltage at the output end of the rectifier of the wireless power receiver, information on a current at the output end of the rectifier of the wireless power receiver, information on a voltage at the output end of a DC/DC converter of the wireless power receiver, information on a current at the output end of the DC/DC converter of the wireless power receiver, temperature information, information on a minimum voltage value (VRECT_MIN_DYN) at the output end of the rectifier of the wireless power receiver, information on an optimum voltage value (VRECT_SET_DYN) at the output end of the rectifier of the wireless power receiver, information on a maximum voltage value (VRECT_HIGH_DYN) at the output end of the rectifier of the wireless power receiver, and warning information (PRU alert). The PRU dynamic signal may include at least one of the aforementioned fields. Herein, "VRECT" refers to voltage at output of the rectifier, "MIN" refers to minimum, and "DYN" refers to dynamic signal.

For example, at least one voltage set value determined according to a charging situation (for example, the information on a minimum voltage value (VRECT_MIN_DYN) at the output end of the rectifier of the wireless power receiver, the information on an optimum voltage value (VRECT_SET_DYN) at the output end of the rectifier of the wireless power receiver, and the information on a maximum voltage value (VRECT_HIGH_DYN) at the output end of the rectifier of the wireless power receiver) may be transmitted in a corresponding field of the PRU dynamic signal. Upon receiving the PRU dynamic signal, the wireless power transmitter may adjust a wireless charging voltage to be transmitted to each wireless power receiver based on the voltage set value included in the PRU dynamic signal.

Among the fields, a PRU Alert may be configured in the data structure as illustrated in Table 2, as follows.

TABLE 2

| 7 | 6 | 5 | 4 | 3 | 2 | 1 | 0 |
|---|---|---|---|---|---|---|---|
| over-voltage | over-current | over-temperature | Charge Complete | TA detect | Transition | restart request | RFU |

Referring to Table 2, the PRU Alert includes a bit for restart request (1), a bit for transition (2), and a bit for wired charging adapter (travel adapter (TA)) detect (3). The Charge Complete bit indicates that a wireless power receiver completes its charging. The over-voltage bit indicates that a voltage at the output of the rectifier of wireless power receiver is larger than a predetermined voltage threshold. The TA detect bit indicates that a wireless power receiver has been connected to a wired charging terminal in the wireless power transmitter that provides wireless charging. The transition bit indicates to the wireless power transmitter that the wireless power receiver is reset before a communication integrated circuit (IC) of the wireless power receiver transitions from the SA mode to the NSA mode. The restart request bit indicates to the wireless power receiver that the wireless power transmitter is ready to resume charging when the wireless power transmitter that has discontinued charging by reducing transmission power due to the occurrence of overcurrent (6) or overtemperature (5) returns to a normal state. The RFU may mean "Reserved for future use".

The PRU Alert may also be configured in the data structure as illustrated in Table 3, as follows.

TABLE 3

| 7 | 6 | 5 | 4 | 3 | 2 | 1 | 0 |
|---|---|---|---|---|---|---|---|
| PRU over-voltage | PRU over-current | PRU over-temperature | PRU Self Protection | Charge Complete | Wired Charger Detect | Mode Transition Bit 1 | Mode Transition Bit 0 |

Referring to Table 3, the PRU Alert may include the fields of overvoltage (7), overcurrent (6), overtemperature (5), PRU Self Protection (4), Charge Complete (3), Wired Charger Detect (2), and Mode Transition (0) and (1). If the overvoltage field is set to '1', this may indicate that the voltage Vrect of the wireless power receiver has exceeded an overvoltage limit. The overcurrent and overtemperature fields may be set in the same manner as the overvoltage field. PRU Self Protection indicates that the wireless power receiver protects itself by directly reducing power affecting a load. In this case, the wireless power transmitter does not need to change a charging state.

According to an embodiment of the present disclosure, bits for Mode Transition may be set to a value indicating the duration of a mode transition procedure to the wireless power transmitter. For example, the Mode Transition bits may be configured as illustrated in Table 4, as follows.

TABLE 4

| Value (Bit) | Mode Transition Bit Description |
|---|---|
| 00 | No Mode Transition |
| 01 | 2 s Mode Transition time limit |
| 10 | 3 s Mode Transition time limit |
| 11 | 6 s Mode Transition time limit |

Referring to Table 4, '00' indicates no mode transition; '01' indicates that the time required to complete a mode transition is 2 seconds; '10' indicates that the time required to complete a mode transition is 3 seconds; and '11' indicates that the time required to complete a mode transition is 6 seconds.

For example, when it takes 3 seconds or less to complete a mode transition, the Mode Transition bits may be set to '10'. Before starting a mode transition procedure, the wireless power receiver may ensure that no impedance shift will occur during the mode transition procedure by changing an input impedance setting to match a 1.1-W power draw. Accordingly, the wireless power transmitter may adjust power (ITX_COIL) for the wireless power receiver according to this setting, and thus, may maintain the power (ITX_COIL) for the wireless power receiver during the mode transition duration.

After a mode transition duration is set by the Mode Transition bits, the wireless power transmitter may maintain the power (ITX_COIL) for the wireless power receiver during the mode transition duration, for example, for 3 seconds. That is, even though the wireless power transmitter receives no response from the wireless power receiver for 3 seconds, the wireless power transmitter may maintain a connection to the wireless power receiver. However, after the mode transition duration elapses, the wireless power transmitter may end power transmission, considering that the wireless power receiver is a rogue object, as will be described later herein.

The wireless power receiver 450 may sense the occurrence of an error and may transmit a warning signal to the wireless power transmitter 400, such as by a PRU dynamic signal or an alert signal. For example, the wireless power receiver 450 may transmit the PRU Alert field, illustrated in Table 1, to indicate an error state to the wireless power transmitter 400. Alternatively, the wireless power receiver 450 may transmit a stand-alone warning signal indicating an error state to the wireless power transmitter 400. Upon receiving the warning signal, the wireless power transmitter 400 may enter a latch fault mode in step S422. The wireless power receiver 450 may enter a null state in step S423.

Figure 5:
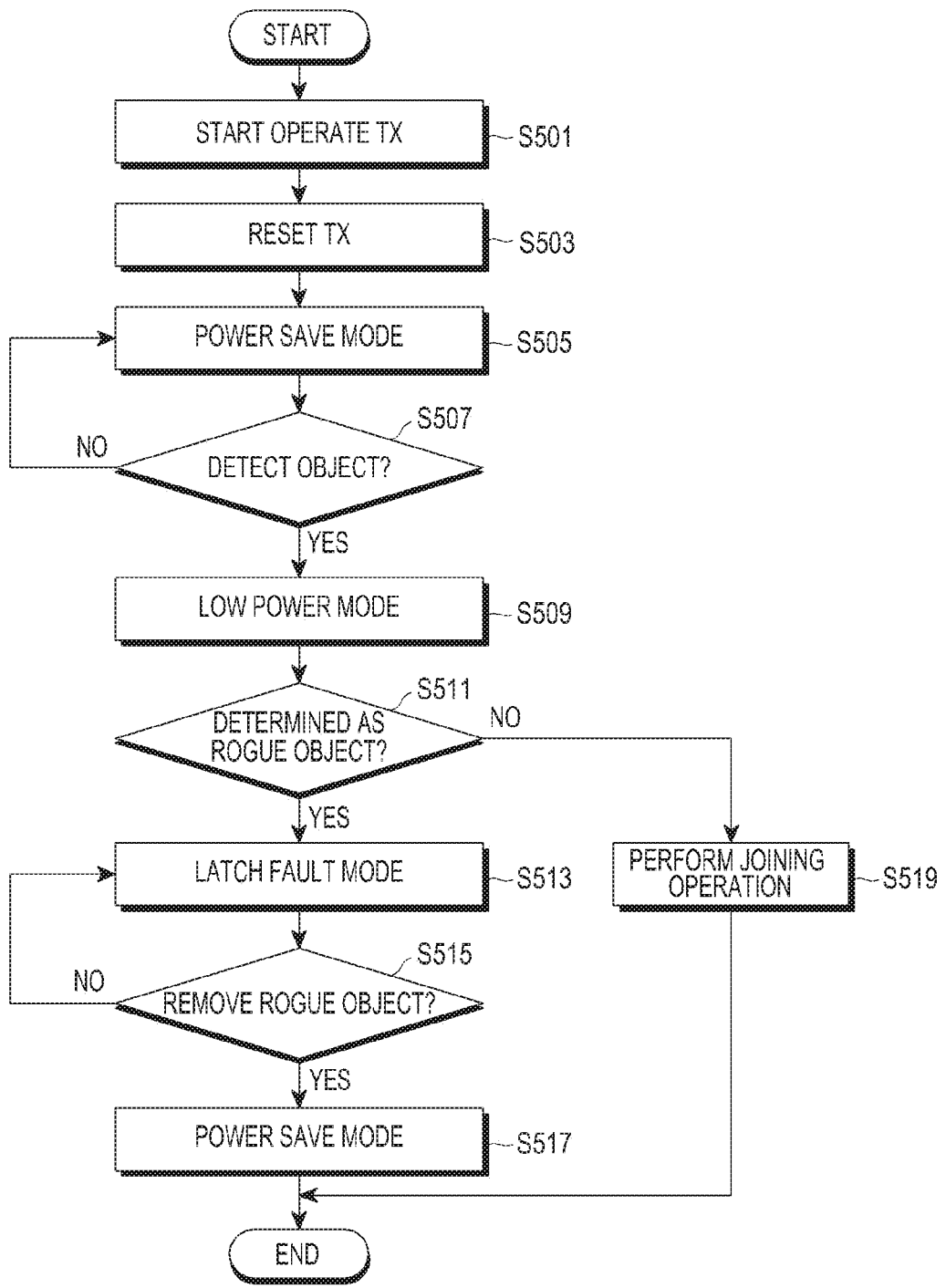
FIG. 5 illustrates operations of a wireless power transmitter and a wireless power receiver according to another embodiment of the present disclosure.

FIG. 5 illustrates operations of a wireless power transmitter and a wireless power receiver according to another embodiment of the present disclosure. The method of FIG. 5 will be described in detail with reference to FIG. 6, which illustrates power applied by the wireless power transmitter according to the embodiment of FIG. 5 with respect to a time axis.

Referring to FIG. 5, the wireless power transmitter may start to operate in step S501, may reset an initial setting in step S503, and may enter the power save mode in step S505.

In the power save mode, the wireless power transmitter may apply different types of power having different power amounts to a power transmission unit. For example, referring to FIG. 6, the wireless power transmitter may apply second detection power 601 and 602 and third detection powers 611, 612, 613, 614, and 615 to the power transmission unit, and may periodically apply the second detection power 601 and 602 within a second period. When the wireless power transmitter applies the second detection power 601 and 602, the second detection power 601 and 602 may last for a second time duration. The wireless power transmitter may periodically apply the third detection powers 611, 612, 613, 614, and 615 within a third period, and the third detection powers 611, 612, 613, 614, and 615 may last for a third time duration. Although the third detection powers 611, 612, 613, 614, and 615 are shown to have different power values, the third detection powers 611, 612, 613, 614, and 615 may have the same or different power values.

After outputting the third detection power 611, the wireless power transmitter may output the third detection power 612 having the same power amount, in which case the third detection power may have a power amount that is sufficient to detect the smallest wireless power receiver, for example, a wireless power receiver of category 1 which is defined in the AFA (A4WP) standard.

After outputting the third detection power 611, the wireless power transmitter may output the third detection power 612 having a different power amount, in which case the respective power amounts of the third detection power may be sufficient to detect wireless power receivers of category 1 to category 5. For example, the third detection power 611 may have a power amount sufficient to detect a wireless power receiver of category 5, the third detection power 612 may have a power amount sufficient to detect a wireless power receiver of category 3, and the third detection power 613 may have a power amount sufficient to detect a wireless power receiver of category 1.

The second detection power 601 and 602 may have a power amount sufficient to drive a controller and/or a communication circuit of the wireless power receiver.

The wireless power transmitter may apply, to a power reception unit, the second detection power 601 and 602 and the third detection powers 611, 612, 613, 614, and 615, respectively, with the second and third periods. When the wireless power receiver is placed on the wireless power transmitter, impedance, viewed from a point of the wireless power transmitter, may be changed. The wireless power transmitter may detect an impedance shift while applying the second detection power 601 and 602 and the third detection powers 611, 612, 613, 614, and 615. For example, the wireless power transmitter may detect an impedance shift while applying the third detection power 615. Accordingly, the wireless power transmitter may detect an object in step S507. When no object is detected in step S507—(NO), the wireless power transmitter may remain in the power save mode, in which the wireless power transmitter applies different types of power periodically in step S505.

However, when an object is detected due to an impedance shift in step S507—(YES), the wireless power transmitter may enter the low power mode, in step S509, in which the wireless power transmitter applies driving power having a power amount sufficient to drive the controller and the communication circuit of the wireless power receiver. For example, referring to FIG. 6, the wireless power transmitter may apply driving power 620 to the power transmission unit. While applying driving power 620, the wireless power transmitter may perform the registration process with the wireless power receiver, i.e. RX1. More specifically, the wireless power receiver may receive the driving power 620 and may drive the controller and/or the communication circuit with the driving power 620. The wireless power receiver may communicate with the wireless power transmitter using the driving power 620 in a predetermined scheme. For example, the wireless power receiver may transmit and receive data for authentication and may join a wireless power network managed by the wireless power transmitter based on the data. However, when a rogue object is placed on the wireless power transmitter, instead of a wireless power receiver, data transmission and reception may not be performed. The wireless power transmitter may determine whether the object is a rogue object in step S511. For example, when the wireless power transmitter fails to receive a response from the object for a preset time, the wireless power transmitter may determine the object as a rogue object.

When the wireless power transmitter determines the object as a rogue object in step S511—(YES), the wireless power transmitter may enter the latch fault mode in step S513. However, when the wireless power transmitter determines that the object is not a rogue object in step S511, the wireless power transmitter may perform a joining operation in step S519. For example, referring to FIG. 6, the wireless power transmitter may periodically apply first power 631 to 634 with a first period. The first power 631 to 634 may be the short-beacon. The wireless power transmitter may detect an impedance shift while applying the first power. When the rogue object is removed in step S515—(YES), the wireless power transmitter may detect an impedance shift, and thus, may determine that the rogue object has been removed. However, when the rogue object is not removed in step S515—(NO), the wireless power transmitter may not detect an impedance shift, and thus, may determine that the rogue object has not been removed and may notify a user that the wireless power transmitter is currently in an error state by outputting at least one of a lamp and a warning sound. Accordingly, the wireless power transmitter may include an output unit to output at least one of a lamp and a warning sound.

When it is determined that the rogue object has not been removed in step S515—(NO), the wireless power transmitter may maintain the latch fault mode in step S513. However, when it is determined that the rogue object has been removed in step S515—(YES), the wireless power transmitter may reenter the power save mode in step S517. For example, referring FIG. 6, the wireless power transmitter may apply second power 651 and 652 and third power 661 to 665.

As described above, when a rogue object is placed on the wireless power transmitter, instead of a wireless power receiver, the wireless power transmitter may enter the latch fault mode, and may determine whether the rogue object has been removed based on an impedance shift that occurs according to power applied in the latch fault mode. That is, in the embodiment of FIGS. 5 and 6, a condition for entry to the latch fault mode may be the presence of a rogue object. Additionally, the wireless power transmitter may have other conditions for entry to the latch fault mode in addition to the presence of a rogue object. For example, the wireless power transmitter may be cross-connected to a mounted wireless power receiver, in which case the wireless power transmitter may also enter the latch fault mode.

Figure 7:
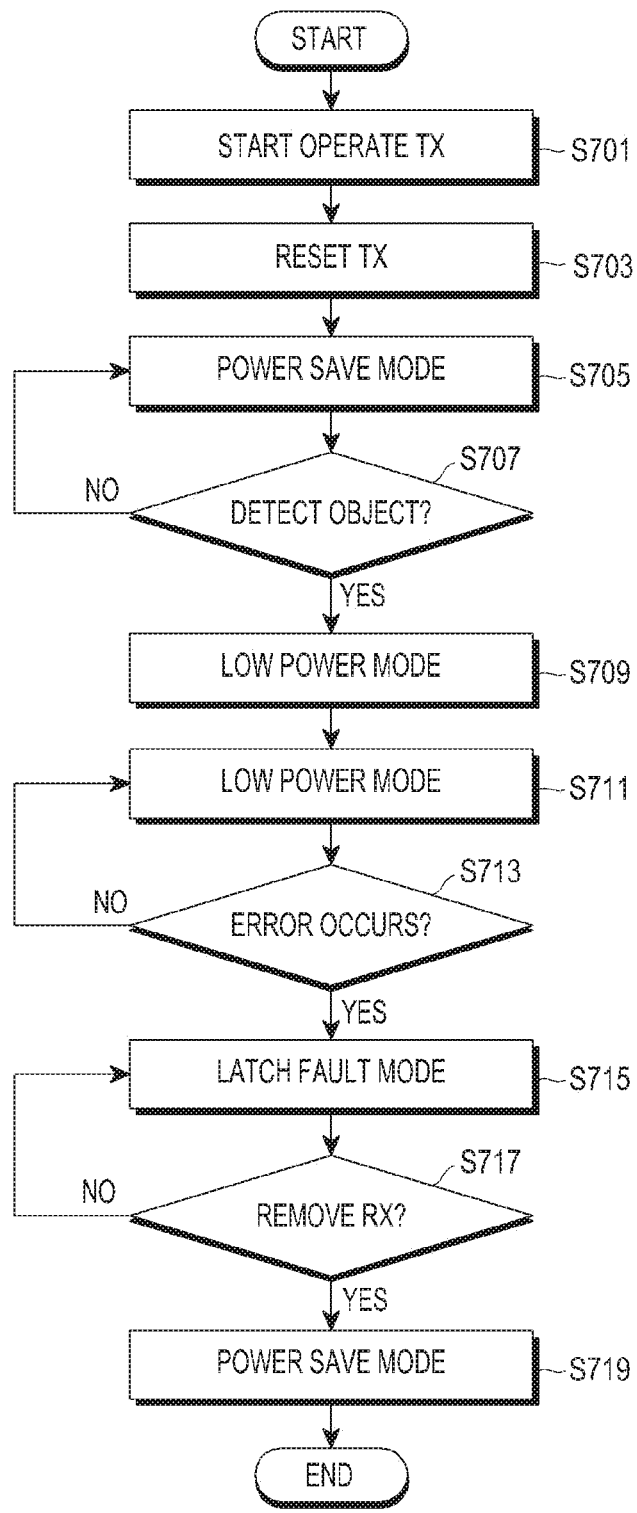
FIG. 7 illustrates a method for controlling a wireless power transmitter according to an embodiment of the present disclosure.

When the wireless power transmitter is cross-connected, the wireless power transmitter is required to return to an initial state and the wireless power receiver is required to be removed. The wireless power transmitter may set cross connection, that is, joining of a wireless power receiver placed on another wireless power transmitter in a wireless power network, as a condition for entry to the latch fault mode. FIG. 7 illustrates a method for controlling a wireless power transmitter according to an embodiment of the present disclosure. The method of FIG. 7 will be described in detail with reference to FIG. 8, which illustrates power applied by the wireless power transmitter according to the embodiment of FIG. 7 with respect to a time axis.

The wireless power transmitter may start to operate in step S701, may reset an initial setting in step S703, and may enter the power save mode in step S705. In the power save mode, the wireless power transmitter may apply different types of power having different power amounts to a power transmitter. For example, referring to FIG. 8, the wireless power transmitter may apply second detection power 801 and 802 and third detection powers 811, 812, 813, 814, and 815 to the power transmission unit. The wireless power transmitter may periodically apply the second detection power 801 and 802 within a second period. When the wireless power transmitter applies the second detection power 801 and 802, the second detection power 801 and 802 may last for a second time duration.

The wireless power transmitter may periodically apply the third detection powers 811, 812, 813, 814, and 815 within a third period. When the wireless power transmitter applies the third detection powers 811, 812, 813, 814, and 815, the third detection powers 811, 812, 813, 814, and 815 may last for a third time duration. the third detection powers 811, 812, 813, 814, and 815 may have different power values, as illustrated, or may have the same power values.

The second detection power 801 and 802 may have a power amount sufficient to drive a controller and/or a communication circuit of the wireless power receiver.

The wireless power transmitter may apply, to a power reception unit, the second detection power 801 and 802 and the third detection powers 811, 812, 813, 814, and 815, respectively, with the second and third periods. When the wireless power receiver is placed on the wireless power transmitter, impedance, viewed from a point of the wireless power transmitter, may be changed. The wireless power transmitter may detect an impedance shift while applying the second detection power 801 and 802 and the third detection powers 811, 812, 813, 814, and 815. For example, the wireless power transmitter may detect an impedance shift while applying the third detection power 815. Accordingly, the wireless power transmitter may detect an object in step S707. When no object is detected in step S707—(NO), the wireless power transmitter may remain in the power save mode, in which the wireless power transmitter applies different types of power periodically in step S705.

However, when an object is detected due to an impedance shift in step S707—(YES), the wireless power transmitter may enter the low power mode, in step S709, in which the wireless power transmitter applies driving power having a power amount sufficient to drive the controller and the communication circuit of the wireless power receiver. For example, referring to FIG. 8, the wireless power transmitter may apply driving power to the power transmission unit. While applying driving power 820, the wireless power transmitter may perform the registration process with the wireless power receiver, i.e. RX1. More specifically, the wireless power receiver may receive the driving power 820 and may drive the controller and/or the communication circuit with the driving power 820. The wireless power receiver may communicate with the wireless power transmitter using the driving power 820 in a predetermined scheme. For example, the wireless power receiver may transmit and receive data for authentication and may join a wireless power network managed by the wireless power transmitter based on the data.

Subsequently, the wireless power transmitter may enter the power transfer mode in which the wireless power transmitter transmits charging power in step S711. For example, referring to FIG. 8, the wireless power transmitter may apply charging power 821, and the charging power 821 may be transmitted to the wireless power receiver.

In the power transfer mode, the wireless power transmitter may determine whether an error has occurred. The error may be the presence of a rogue object on the wireless power transmitter, a cross connection, an overvoltage, an overcurrent, or an overtemperature. The wireless power transmitter may include a sensor to measure an overvoltage, an overcurrent, or an overtemperature. For example, the wireless power transmitter may measure a voltage or current at a reference point and may determine that a measured voltage or current exceeding a threshold satisfies an overvoltage or overcurrent condition. The wireless power transmitter may include a temperature sensor, which may measure a temperature at a reference point of the wireless power transmitter. When the temperature at the reference point exceeds a threshold, the wireless power transmitter may determine that an overtemperature condition is satisfied.

When the wireless power transmitter determines an overvoltage, overcurrent, or overtemperature state according to a measured voltage, current, or temperature value, the wireless power transmitter may prevent the overvoltage, the overcurrent, or the overtemperature by decreasing wireless charging power by a preset value. When the voltage value of the decreased wireless charging power is below a set minimum value (for example, the minimum voltage value VRECT_MIN_DYN at the output end of a rectifier of the wireless power receiver), wireless charging is discontinued, and thus a voltage set value may be re-adjusted according to the embodiment of the present disclosure.

Figure 8:
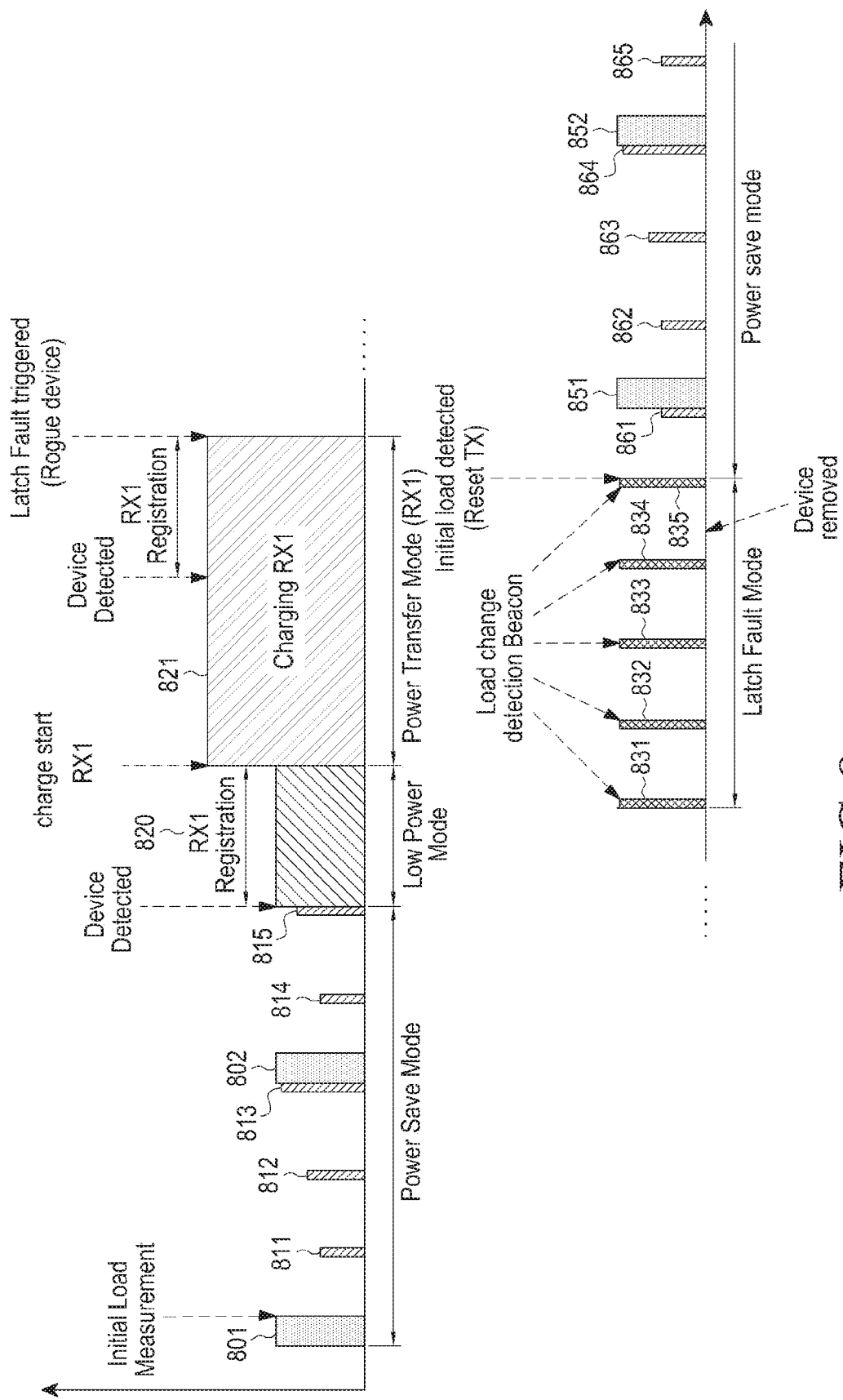
FIG. 8 illustrates power applied by the wireless power transmitter according to the embodiment of FIG. 7 with respect to a time axis.

While the presence of a rogue object on the wireless power transmitter is shown as an error in the embodiment of FIG. 8, the error is not limited to the presence of a rogue object. It would be readily understood to those skilled in the art that the wireless power transmitter may operate in a similar manner regarding the presence of a rogue object, a cross connection, an overvoltage, an overcurrent, and an overtemperature.

When no error occurs in step S713—(NO), the wireless power transmitter may remain in the power transfer mode in step S711. However, when an error occurs in step S713—(YES), the wireless power transmitter may enter the latch fault mode in step S715. For example, referring to FIG. 8, the wireless power transmitter may apply first power 831 to 835. The first power 831 to 835 may be the short-beacon. The wireless power transmitter may output an error notification including at least one of a lamp and a warning sound during the latch fault mode. When it is determined that the rogue object or the wireless power receiver has not been removed in step S717—(NO), the wireless power transmitter may maintain the latch fault mode in step S715. However, when it is determined that the rogue object or the wireless power receiver has been removed in step S717—(YES), the wireless power transmitter may reenter the power save mode in step S719. For example, referring to FIG. 8, the wireless power transmitter may apply second powers 851 and 852 and third powers 861 to 865.

The operation of the wireless power transmitter in the occurrence of an error while transmitting charging power has been described above. Hereinafter, an operation of a wireless power transmitter when a plurality of wireless power receivers receives charging power on the wireless power transmitter will be described.

Figure 9:
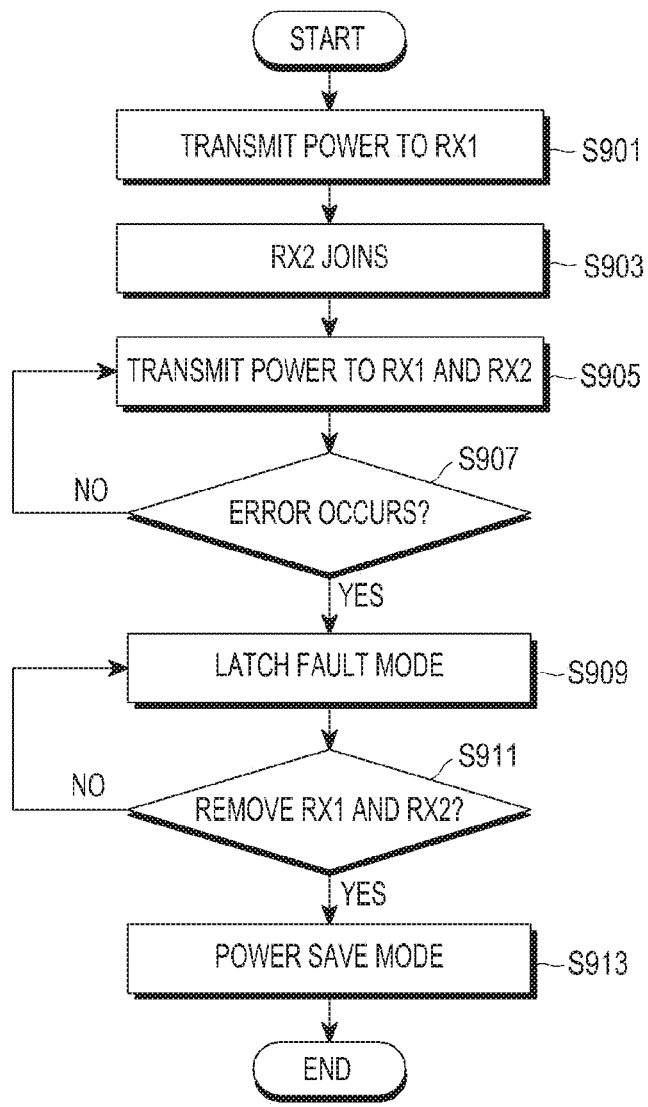
FIG. 9 illustrates a method for controlling a wireless power transmitter according to an embodiment of the present disclosure.

FIG. 9 illustrates a method for controlling a wireless power transmitter according to an embodiment of the present disclosure. The method of FIG. 9 will be described in detail with reference to FIG. 10, which illustrates power applied by the wireless power transmitter according to the embodiment of FIG. 9 with respect to a time axis.

Referring to FIG. 9, the wireless power transmitter may transmit charging power to a first wireless power receiver in step S901, may allow a second wireless power receiver to join a wireless power network in step S903, and may also transmit charging power to the second wireless power receiver in step S905. More specifically, the wireless power transmitter may apply the sum of charging power required for the first wireless power receiver and charging power required for the second wireless power receiver to power reception units.

Figure 10:
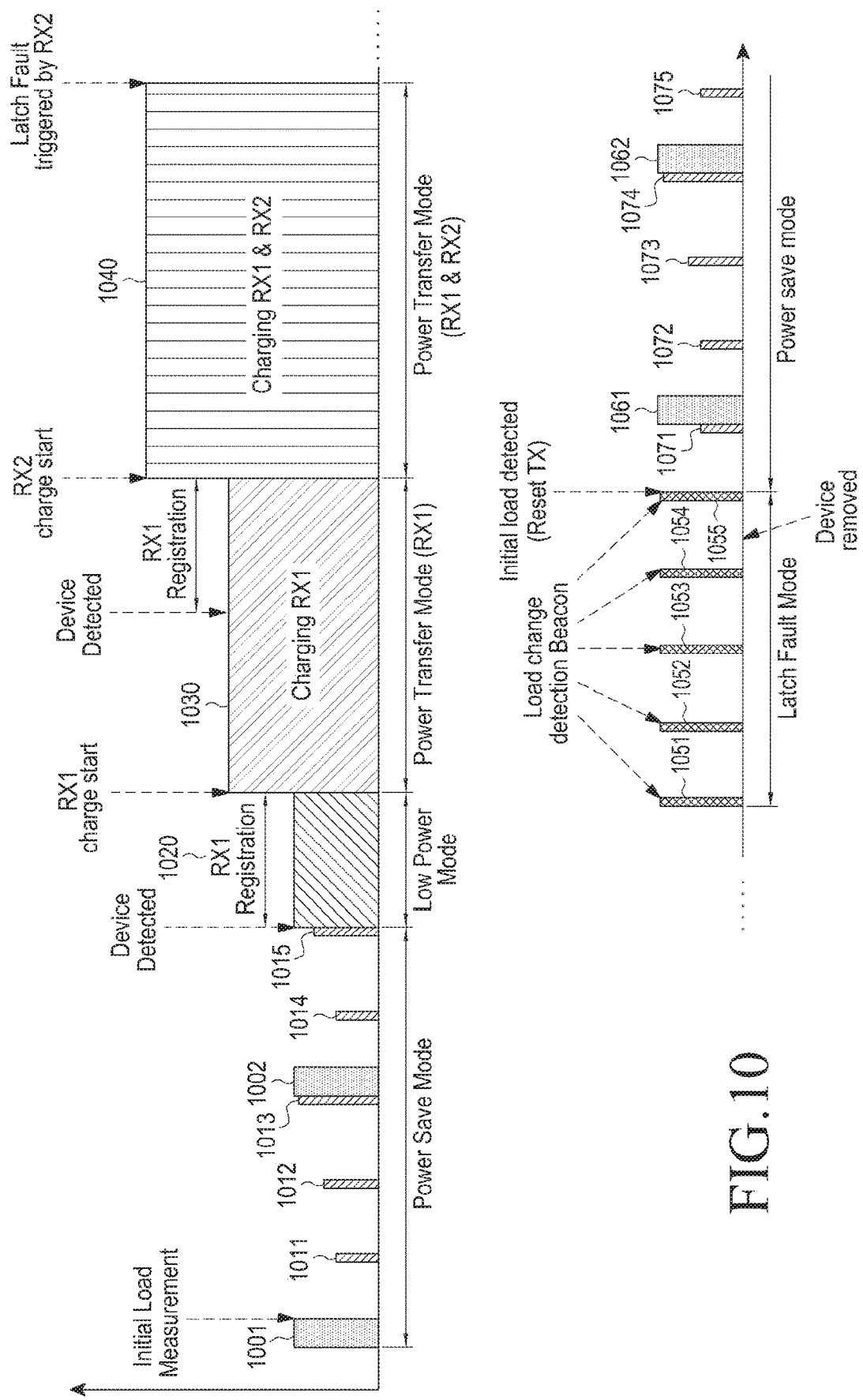
FIG. 10 illustrates power applied by the wireless power transmitter according to the embodiment of FIG. 9 with respect to a time axis.

FIG. 10 illustrates an embodiment of steps S901 to S905 in FIG. 9. For example, the wireless power transmitter may maintain the power save mode in which the wireless power transmitter applies second detection powers 1001 and 1002 and third detection powers 1011 to 1015. Subsequently, the wireless power transmitter may detect the first wireless power receiver and may enter the low power mode in which the wireless power transmitter maintains detection power 1020. Thereafter, the wireless power transmitter may enter the power transfer mode in which the wireless power transmitter applies first charging power 1030. The wireless power transmitter may detect the second wireless power receiver and may allow the second wireless power receiver to join the wireless power network. In addition, the wireless power transmitter may apply second charging power 1040 corresponding to the sum of power required for the first wireless power receiver and power required for the second wireless power receiver.

Returning to FIG. 9, while transmitting charging power to both of the first and second wireless power receivers in step S905, the wireless power transmitter may detect an error in step S907. As described above, the error may be the presence of a rogue object, a cross connection, an overvoltage, an overcurrent, or an overtemperature. When no error occurs in step S907—(NO), the wireless power transmitter continues to apply the second charging power 1040.

However, when an error occurs in step S907—(YES), the wireless power transmitter may enter the latch fault mode in step S909. For example, referring to FIG. 10, the wireless power transmitter may apply first power 1051 to 1055 with a first period. The first power 1051 to 1055 may be the short-beacon. The wireless power transmitter may determine whether both of the first and second wireless power receivers have been removed in step S911. For example, the wireless power transmitter may detect an impedance shift while applying the first power 1051 to 1055. The wireless power transmitter may determine whether both of the first and second wireless power receivers have been removed by determining whether impedance has returned to an initial value.

When determining that both of the first and second wireless power receivers have been removed in step S911—(YES), the wireless power transmitter may enter the power save mode in step S913. For example, referring to FIG. 10, the wireless power transmitter may apply second detection powers 1061 and 1062 and third detection powers 1071 to 1075 respectively with second and third periods.

As described above, even though the wireless power transmitter applies charging power to a plurality of wireless power receivers, upon the occurrence of an error, the wireless power transmitter may readily determine whether a wireless power receiver or a rogue object has been removed.

Figure 11:
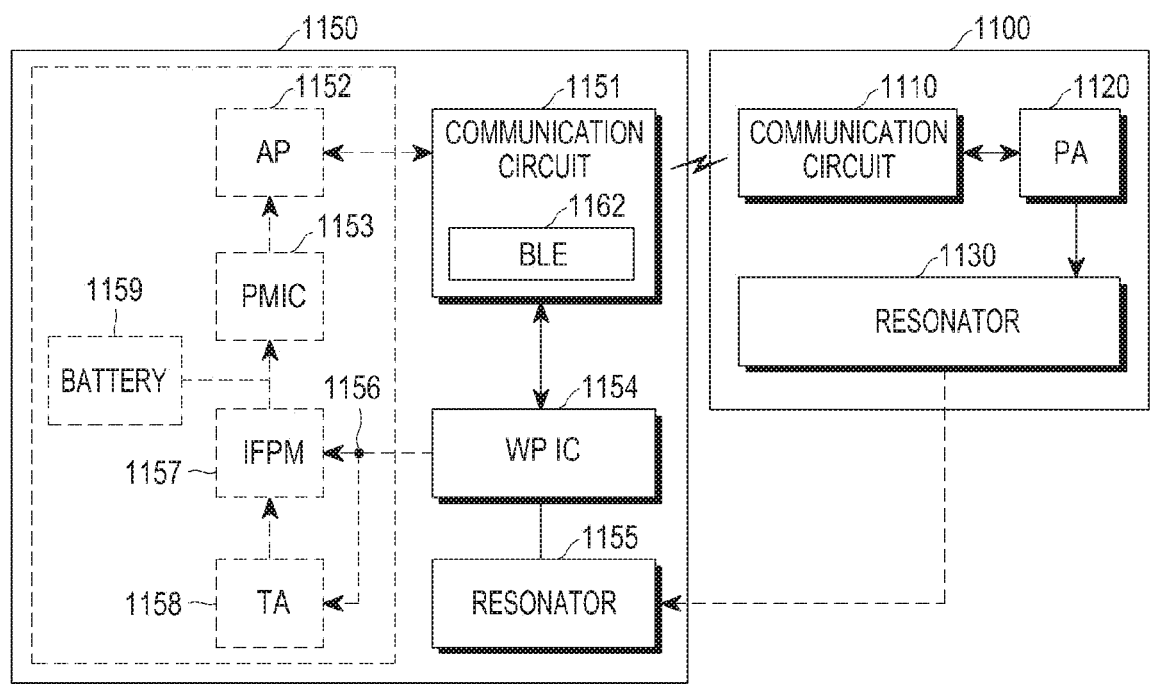
FIG. 11 illustrates a wireless power transmitter and a wireless power receiver in a stand alone (SA) mode according to an embodiment of the present disclosure.

FIG. 11 illustrates a wireless power transmitter and a wireless power receiver in the SA mode according to an embodiment of the present disclosure.

The wireless power transmitter 1100 may include a communication circuit 1110, a power amplifier (PA) 1120, and a resonator 1130. The wireless power receiver 1150 may include a communication circuit 1151, an application processor (AP) 1152, a power management integrated circuit (PMIC) 1153, a wireless power integrated circuit (WPIC) 1154, a resonator 1155, an interface power management IC (IFPM) 1157, a travel adapter (TA) 1158, and a battery 1159.

The communication circuit 1110 may be configured as a WiFi/BT combo IC and may communicate with the communication circuit 1151 in a predetermined scheme, such as BLE. For example, the communication circuit 1151 of the wireless power receiver 1150 may transmit a PRU dynamic signal having the data structure illustrated in Table 1 to the communication circuit 1110 of the wireless power transmitter 1100. As described above, the PRU dynamic signal may include at least one of voltage information, current information, temperature information, and warning information on the wireless power receiver 1150.

An output power value from the PA 1120 may be adjusted based on the received PRU dynamic signal. For example, when an overvoltage, an overcurrent, or an overtemperature is applied to the wireless power receiver 1150, a power value output from the PA 1120 may be decreased. When the voltage or current of the wireless power receiver 1150 is below a preset value, the power value output from the PA 1120 may be increased.

Charging power from the resonator 1130 may be transmitted wirelessly to the resonator 1155.

The WPIC 1154 may rectify the charging power received from the resonator 1155, may perform DC/DC conversion on the rectified charging power, and may drive the communication circuit 1151 or charge the battery 1159 using the converted power.

A wired charging terminal may be inserted into the TA 1158. A wired charging terminal, such as a 30-pin connector or a universal serial bus (USB) connector, may be inserted into the TA 1158, which may receive power from an external power source and may charge the battery 1159 with the received power.

The IFPM 1157 may process the power received from the wired charging terminal and may output the processed power to the battery 1159 and the PMIC 1153.

The PMIC 1153 may manage power received wirelessly or by wire and power applied to each component of the wireless power receiver 1150. The AP 1152 may receive power information from the PMIC 1153 and may control the communication circuit 1151 to transmit a PRU dynamic signal for reporting the power information.

A node 1156 connected to the WPIC 1154 may be also connected to the TA 1158. When a wired charging connector is inserted into the TA 1158, a preset voltage, such as 5 V, may be applied to the node 1156. The WPIC 1154 may determine whether the wired charging adaptor has been inserted by monitoring a voltage applied to the node 1156.

The AP 1152 has a stack of predetermined communication schemes, for example, a WiFi/BT/BLE stack. Accordingly, for communication for wireless charging, the communication circuit 1151 may load the stack from the AP 1152 and may communicate with the communication circuit 1110 of the wireless power transmitter 1100 using BT/BLE based on the stack.

However, data for wireless power transmission may not be retrieved from the AP 1152 due to a power-off of the AP 1152, or too much power may be lost to maintain the on state of the AP 1152 while retrieving the data from a memory of the AP 1152 and using the retrieved data.

When the residual power amount of the battery 1159 is below a minimum power limit, i.e., in a dead batter state, the AP 1152 may be turned off and the battery 1159 may be wirelessly charged using some components for wireless charging in the wireless power receiver, for example, the communication circuit 1151, the WPIC 1154, and the resonator 1155. Since the AP 1152 is not operated in the dead battery state, the communication circuit 1151 may not receive the stack of the predetermined communication schemes from the AP 1152. In preparation for this case, a portion of the stack of the predetermined communication schemes, for example, a BLE stack, may be fetched from the AP 1152 and may be stored in a memory 1162 of the communication circuit 1151. Accordingly, the communication circuit 1151 may communicate for wireless charging with the wireless power transmitter 1100 using the stack of the communication scheme stored in the memory 1162, that is, a wireless charging protocol. The communication circuit 1151 may have an internal memory, and the BLE stack may be stored in a read only memory (ROM) in the SA mode.

As described above, a mode in which the communication circuit 1151 communicates using the stack of the communication scheme stored in the memory 1162 may be referred to as the SA mode. Accordingly, the communication circuit 1151 may manage the charging procedure based on the BLE stack.

Figure 12A:
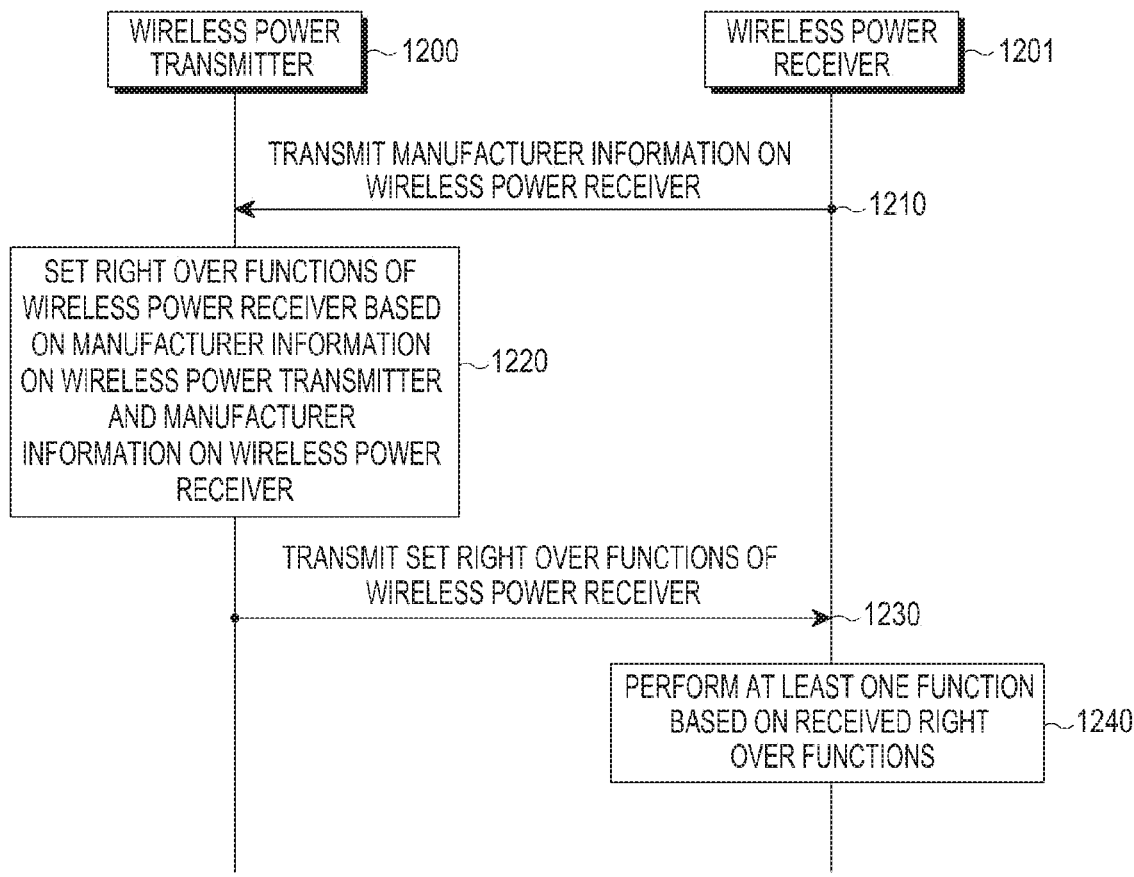
FIG. 12A illustrates operations of a wireless power transmitter and a wireless power receiver according to embodiments of the present disclosure.

FIG. 12A illustrates operations of a wireless power transmitter and a wireless power receiver according to embodiments of the present disclosure.

Referring to FIG. 12A, the wireless power receiver 1201 may transmit manufacturer information on the wireless power receiver 1201 to the wireless power transmitter 1200 in step 1210. In the following description, the expression "the wireless power transmitter 1200 or the wireless power receiver 1201 may perform a specific operation" may indicate that a controller included in the wireless power transmitter 1200 or the wireless power receiver 1201 may perform the operation. The expression may also indicate that a controller included in the wireless power transmitter 1200 or the wireless power receiver 1201 may control another hardware component, such as a communication module, to perform the operation.

The wireless power receiver 1201 may transmit the manufacturer information on the wireless power receiver 1201 at different times, such as before a communication session, such as BLE, is formed. For example, the wireless power receiver 1201 may transmit the manufacturer information via an advertisement signal defined in BLE communication. In another embodiment, the wireless power receiver 1201 may transmit the manufacturer information on the wireless power receiver 1201 to the wireless power transmitter 1200 after a communication session, such as BLE, is formed. The foregoing time and foregoing signals used to transmit the manufacturer information are only illustrative examples, and it would be readily understood by those skilled in the art that the type present disclosure is not limited thereto.

In step 1220, the wireless power transmitter 1200 may set an authority (e.g., a right) over functions of the wireless power receiver 1201 based on manufacturer information on the wireless power transmitter 1200 and the manufacturer information on the wireless power receiver 1201. In detail, the wireless power transmitter 1200 may identify the manufacturer information on the wireless power receiver 1201 by parsing a signal received in step 1210. The manufacturer information being included, for example, in a specific field of the PRU static signal, may be identified in advance by the wireless power transmitter 1200 and the wireless power receiver 1201. The wireless power transmitter 1200 may identify the manufacturer information on the wireless power transmitter 1200 in advance. Accordingly, the wireless power transmitter 1200 may set the authority over the functions of the wireless power receiver 1201 based on both the manufacturer information on the wireless power transmitter 1200 and the manufacturer information on the wireless power receiver 1201.

For example, when both the wireless power transmitter 1200 and the wireless power receiver 1201 have information on manufacturer A, the wireless power transmitter 1200 may assign an authority over all functions supported by manufacturer A to the wireless power receiver 1201. When the wireless power transmitter 1200 has information on manufacturer B and the wireless power receiver 1201 has the information on manufacturer A, the wireless power transmitter 1200 may assign an authority over a function, among the functions supported by manufacturer A, that is equivalent to a function supported by manufacturer B to the wireless power receiver 1201.

For example, suppose that manufacturer B supports a quick charging function and a text information transmission/reception function and manufacturer A supports a text information transmission/reception function and a notification transmission/reception function. A wireless power transmitter 1200 of manufacturer A may set an authority to allow the quick charging function and the text information transmission/reception function to a wireless power receiver 1201 based on manufacturer information on the wireless power receiver 1201 of manufacturer A. The wireless power transmitter 1200 of manufacturer A may set an authority to allow the text information transmission/reception function and the notification transmission/reception function to a wireless power receiver 1201 based on the wireless power receiver 1201 of manufacturer B.

In another embodiment, the wireless power transmitter 1200 may set the authority using only the manufacturer information on the wireless power receiver 1201. For example, when the wireless power transmitter 1200 is manufactured for general use, the wireless power transmitter 1200 may set the authority using only the manufacturer information on the wireless power receiver 1201.

In step 1230, the wireless power transmitter 1200 may transmit the set authority over the functions of the wireless power receiver 1201. As described above, the wireless power transmitter 1200 may transmit a message indicating whether to allow at least part of the functions of the wireless power receiver 1201. For example, the wireless power transmitter 1200 may transmit a client characteristic configuration descriptor (CCCD) indicating whether to allow each function. Table 5 illustrates examples of authorities according to embodiments of the present disclosure, as follows.

TABLE 5

| Function | Permission status |
| --- | --- |
| Quick charging | ○ |
| Text transmission/reception | ○ |
| Notification transmission/reception | X |
| Wireless power transmitter LED control | X |

As described above, the wireless power transmitter 1200 may set the authority over the functions of the wireless power receiver 1201 in view of compatibility between manufacturers. For example, the wireless power transmitter 1200 may include no LED, in which case the wireless power transmitter 1200 may not assign an authority over an LED control function and may transmit a message indicating that the authority over the LED control function is not assigned. In Table 5, "O" indicates assigned priority, while "X" indicates no assigned priority.

Table 6 illustrates examples of authorities according to other embodiments of the present disclosure, as follows.

TABLE 6

| Function (GATT primary service base handle + offset) | Permission status |
| --- | --- |
| 51 | 1 |
| 52 | 1 |
| 53 | 0 |
| 54 | 0 |

Table 6 illustrates examples of authorities over the functions of the wireless power receiver 1201 that are set in advance as offsets from a generic attribute profile (GATT) primary service base handle. For example, quick charging is preset as a value of a GATT primary service base handle value plus 51, which may be identified in advance by the wireless power transmitter 1200 and the wireless power receiver 1201. For example, the GATT primary service handle +0 to +50 may be defined in the table 16 of specification of AFA 1 TS-0010-0 v3.00 (Jun. 15, 2016), i.e. the table 7 of the present disclosure. In addition, a permission status is indicated with a flag, a flag equal to 1 indicating "allowed", and a flag equal to 0 indicating "not-allowed", which may also be identified in advance by the wireless power transmitter 1200 and the wireless power receiver 1201. Accordingly, when the wireless power receiver 1201 receives a signal as illustrated in Table 6, the wireless power receiver 1201 may determine that allowed functions (functions indicated by a flag of 1) are a quick charging function (that is, a function with an offset of 51) and a text transmission/reception function (that is, a function with an offset of 52). Using the authorities over the functions designated with the offsets may reduce the information quantity of messages transmitted/received between the wireless power transmitter 1200 and the wireless power receiver 1201. The offsets in Table 6 are provided merely for illustrative purposes, and signals associated with the authorities may be indicated directly with handle values. For manufacturer-specific (vendor-specific) parameter characteristics, handle values having an offset of +51 from the GATT primary service base handle may be reserved for vendor-specific use.

For example, a wireless power transmission (WPT) service illustrated in Table 7, as follows, may be defined by each handle value. The type may represent the type of the WPT service. The Default value may represent value preset for representing the WTP service. The Attribute permissions may represent permission of the specific WTP service. The Notes may represent the information of the WPT service. The Mandatory handle value may represent the handle value of the WTP service.

TABLE 7

| Type (16 bit) | Default value | Attribute permissions | Notes | Mandatory handle value |
| --- | --- | --- | --- | --- |
| 0x2800 GATT_PRIMARY_SERVICE_UUID | WPT_SERVICE_UUID (16-bit) | GATT_PERMIT_READ | Start of WPT Service | (GATT Primary Service Handle) |
| 0x2803 GATT_CHARACTERISTIC_UUID | Properties = read/write UUID = WPT_CHARACTERISTIC_BASE_UUID | GATT_PERMIT_READ | PRU Control Characteristic declaration | GATT Primary Service Handle) + 1 |
| WPT_CHARGING_PRU_CONTROL_UUID | 00000 (5 Octets) | GATT_PERMIT_READ \| GATT_PERMIT_WRITE | PRU Control Characteristic value | GATT Primary Service Handle) + 2 |
| 0x2803 GATT_CHARACTERISTIC_UUID | Properties = read/write UUID = WPT_CHARACTERISTIC_BASE_UUID + 1 | GATT_PERMIT_READ | PTU Static Parameter Characteristic declaration | GATT Primary Service Handle) + 3 |
| WPT_CHARGING_PTU_STATIC_UUID | 00000000000000000 (17 Octets | GATT_PERMIT_READ \| GATT_PERMIT_WRITE | PTU Static Parameter Characteristic value | GATT Primary Service Handle) + 4 |
| 0x2803 GATT_CHARACTERISTIC_UUID | Properties = read/notify UUID = WPT_CHARACTERISTIC_BASE_UUID + 2 | GATT_PERMIT_READ | PRU Alert Parameter Characteristic declaration | GATT Primary Service Handle) + 5 |
| WPT_CHARGING_PRU_ALERT_UUID | 0 (1 Octet) | GATT_PERMIT_READ \| GATT_PERMIT_NOTIFY | PRU Alert Parameter Characteristic value | GATT Primary Service Handle) + 6 |
| 0x2902 CLIENT_CHARACTERISTIC_CONFIGURATION_UUID | 0 (1 Octet) | GATT_PERMIT_READ \| GATT_PERMIT_WRITE | Client Characteristic Configuration UUID for PRU Alert | GATT Primary Service Handle) + 7 |
| 0x2803 GATT_CHARACTERISTIC_UUID | Properties = read UUID = WPT_CHARACTERISTIC_BASE_UUID + 3 | GATT_PERMIT_READ | PRU Static Parameter Characteristic declaration | GATT Primary Service Handle) + 8 |
| WPT_CHARGING_PRU_STATIC_UUID | 000000000000000000000 (20 Octets) | GATT_PERMIT_READ | PRU Static Parameter Characteristic value | GATT Primary Service Handle) + 9 |
| 0x2803 GATT_CHARACTERISTIC_UUID | Properties = read UUID = WPT_CHARACTERISTIC_BASE_UUID + 4 | GATT_PERMIT_READ | PRU Dynamic Parameter Characteristic declaration | GATT Primary Service Handle) + 10 |

TABLE 7-continued

| Type (16 bit) | Default value | Attribute permissions | Notes | Mandatory handle value |
|---|---|---|---|---|
| WPT_CHARGING_PRU_DYNAMIC_UUID | 00000000000000000000 (20 Octets) | GATT_PERMIT_READ | PRU Dynamic Parameter Characteristic value | GATT Primary Service Handle) + 11 |
| RFU | RFU | RFU | RFU | GATT Primary Service Handle) + 12 . . . 50 |
| WPT VENDOR SPECIFIC UUID | 00000000000000 000000 (20 octets) | GATT PERMIT READ | Vendor Specific Characteristic value | GATT Primary Service Handle) + xx |

As described above, handle values having an offset of +50 from the GATT primary service base handle may be reserved for allocation to manufacturer-available services among WPT services according to the present application.

In step 1240, the wireless power receiver 1201 may perform at least one function based on the received authority over the functions. For example, when the wireless power receiver 1201 receives a signal including the authorities illustrated in Table 5 or 6, the wireless power receiver 1201 may directly request quick charging from the wireless power transmitter 1200. In conventional BLE communications, when the wireless power transmitter 1200 is set as a master node, the wireless power receiver 1201 as a slave node may not directly request a function from the wireless power transmitter 1200.

According to embodiments of the present disclosure, the wireless power receiver 1201 may directly request the implementation of a function based on the authority assigned by the wireless power transmitter 1200, and may perform a quick charging operation corresponding to the request for quick charging from the wireless power receiver 1201. That is, the wireless power transmitter 1200 may perform a function supported by the manufacturer of the wireless power receiver 1201.

Figure 12B:
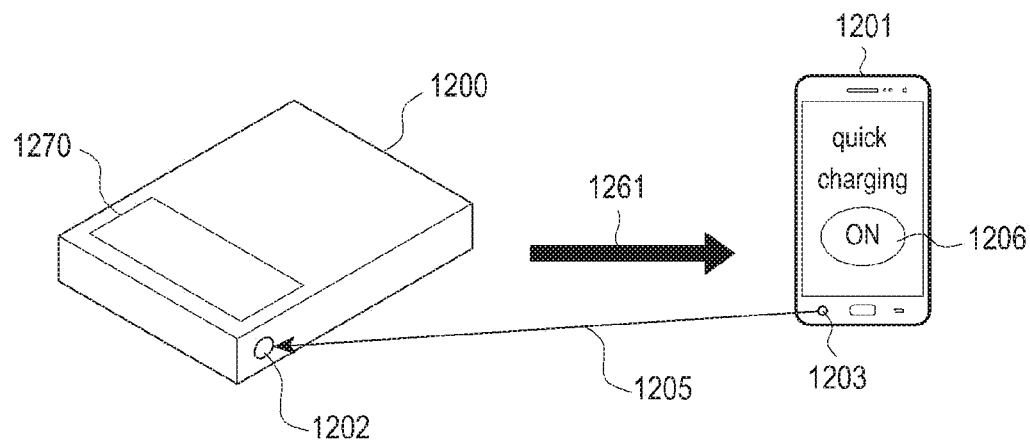
FIGS. 12B, 12C, and FIG. 12D are conceptual views illustrating operations of the wireless power transmitter and the wireless power receiver according to embodiments of the present disclosure.
Figure 12C:
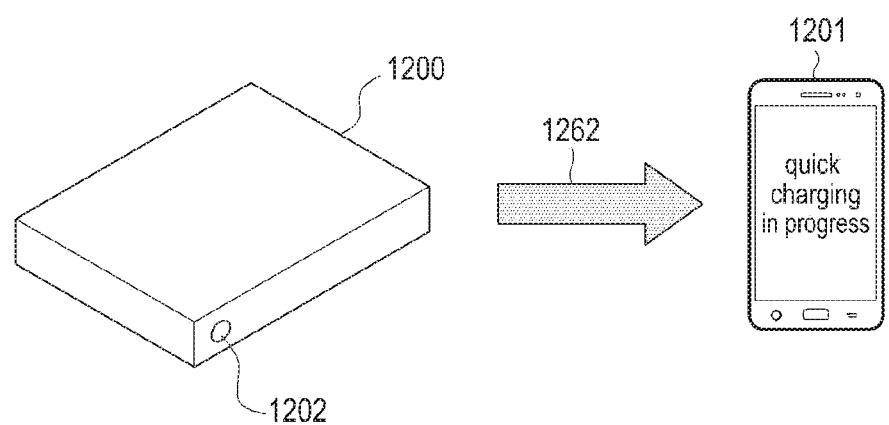
Figure 12D:
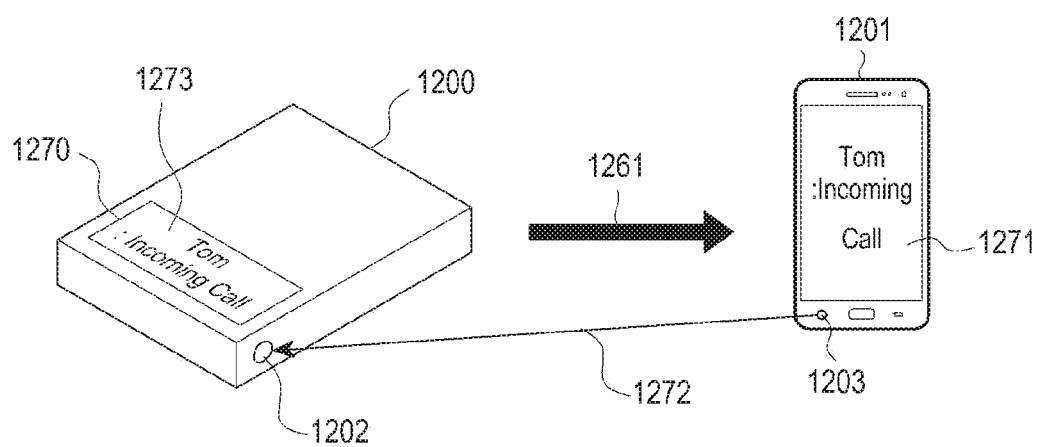

FIGS. 12B, 12C and FIG. 12D are conceptual views illustrating operations of the wireless power transmitter and the wireless power receiver according to embodiments of the present disclosure. Referring to FIG. 12B, the wireless power transmitter 1200 may charge the wireless power receiver 1201 with first power 1261. A communication circuit 1202 of the wireless power transmitter 1200 may communicate with a communication circuit 1203 of the wireless power receiver 1201. The wireless power transmitter 1200 may receive a signal including the manufacturer information on the wireless power receiver 1201, may set an authority based on the manufacturer information on the wireless power receiver 1201, and may transmit a signal including the authority to the wireless power receiver 1201.

The wireless power receiver 1201 may perform a function based on the received authority. For example, the wireless power transmitter 1200 may allow a quick charging function and may transmit an authority over the quick charging function to the wireless power receiver 1201, which may display a graphic user interface (GUI) 1206 associated with quick charging.

When a quick charging command is received from a user, the wireless power receiver 1201 may transmit a signal 1205 requesting quick charging to the wireless power transmitter 1200. The signal 1205 requesting quick charging may be set as a different handle value, such as a handle value of the GATT primary service base handle + an offset of 55. The wireless power receiver 1201 may request the wireless power transmitter 1200 to perform quick charging by transmitting the signal 1205 including an offset of +55. The handle value including the added offset may be transmitted/received using a CCCD at a random time.

Referring to FIG. 12C, the wireless power transmitter 1200 may transmit second power 1262, which is greater than the first power 1261, to the wireless power receiver 1201 corresponding to the signal 1205 requesting quick charging received from the wireless power receiver 1201, and may perform subsequent operations associated with quick charging with the wireless power receiver 1201. For example, when a VRECT from the wireless power receiver 1201 satisfies a specific condition, the wireless power transmitter 1200 may perform an operation of decreasing a power level, which may be set by the manufacturer. When the wireless power transmitter 1200 and the wireless power receiver 1201 support the same function, the wireless power transmitter 1200 and the wireless power receiver 1201 may operate according to a set procedure regardless of whether the manufacturers of the wireless power transmitter 1200 and the wireless power receiver 1201 are the same or different.

FIG. 12D is a conceptual view illustrating operations of the wireless power transmitter 1200 and the wireless power receiver 1201 according to another embodiment of the present disclosure. In FIG. 12D, the wireless power transmitter 1200 may transmit an authority to allow a notification transmission/reception function of the wireless power receiver 1201 to the wireless power receiver 1201, which may display a notification 1271 of an incoming call on a display and may transmit a signal 1272 including the notification to the wireless power transmitter 1200. The wireless power transmitter 1200 may display a notification 1273 on a display 1270 based on the received signal 1272.

Figure 13:
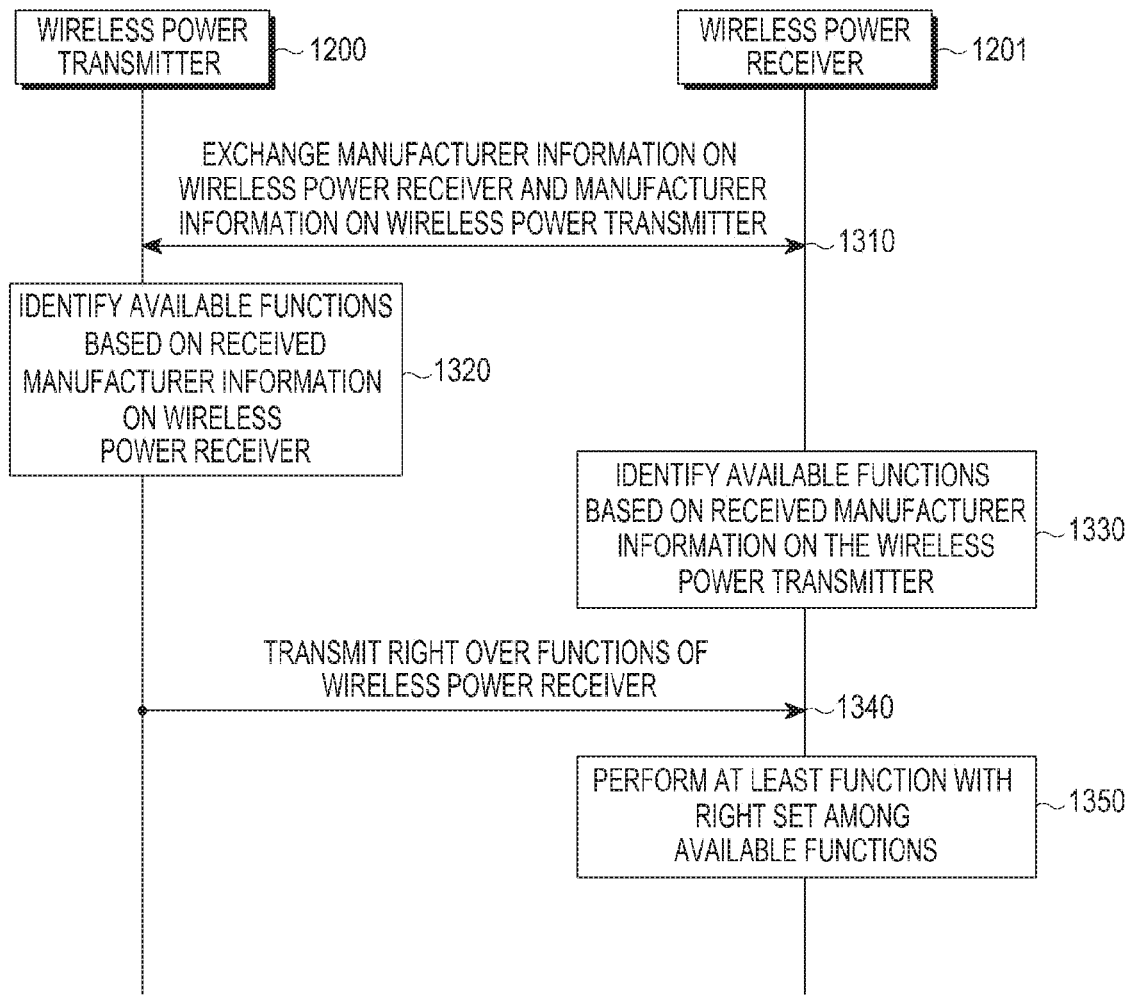
FIG. 13 illustrates operations of a wireless power transmitter and a wireless power receiver according to embodiments of the present disclosure.

FIG. 13 illustrates operations of a wireless power transmitter and a wireless power receiver according to embodiments of the present disclosure.

In step 1310, the wireless power transmitter 1200 and the wireless power receiver 1201 may exchange manufacturer information on the wireless power receiver 1201 and manufacturer information on the wireless power transmitter 1200. For example, as illustrated in FIG. 12A, the wireless power transmitter 1200 may receive the manufacturer information on the wireless power receiver 1201, and may transmit the manufacturer information on the wireless power transmitter 1200 in response to or regardless of the receipt of the manufacturer information on the wireless power receiver 1201. It would be readily understood by those skilled in the art that the time the wireless power transmitter 1200 transmits the manufacturer information and the type of a signal used to transmit the manufacturer information are not limited.

In step 1320, the wireless power transmitter 1200 may identify available functions based on the received manufacturer information on the wireless power receiver 1201. For example, the wireless power transmitter 1200 may identify functions compatibly used by the manufacturer of the wireless power receiver 1201.

In step 1330, the wireless power receiver 1201 may identify available functions of the wireless power receiver based on the received manufacturer information on the wireless power transmitter 1200.

In step 1340, the wireless power transmitter 1200 may transmit an authority over functions of the wireless power receiver 1201. The wireless power transmitter 1200 may transmit the authority set based on the identified available functions.

In step 1350, the wireless power receiver 1201 may perform at least a function with an authority set among the available functions.

Figure 14:
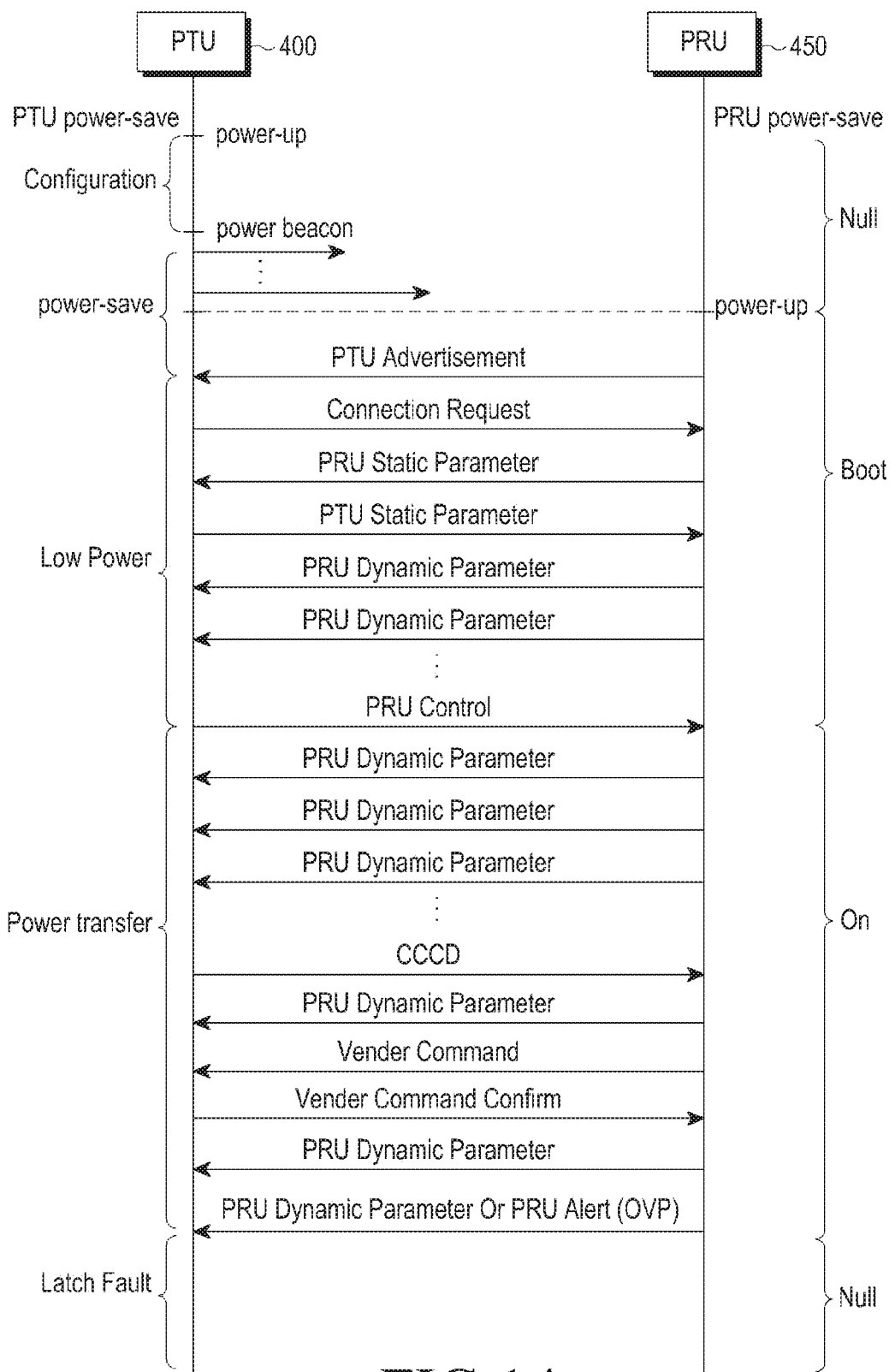
FIG. 14 illustrates signal transmission/reception according to embodiments of the present disclosure.

FIG. 14 illustrates signal transmission/reception according to embodiments of the present disclosure. In FIG. 14, a PTU 400 may refer to a wireless power transmitter, and a PRU 450 may refer to a wireless power receiver, as illustrated in FIG. 4. The PTU 400 may be powered up and may enter a configuration mode. When configuration is ended, the PTU 400 may enter the power save mode. The PTU 400 may apply a power beacon for detecting a PRU 450 to a resonator. The power beacon may include a short beacon with a relatively short length and a long beacon with a relatively long length. The short beacon may be a sufficient amount of power to detect a load change in a PRU 450 of each category. The long beacon may be a sufficient amount of power for a communication module of a PRU 450 to wake up to operate. The PRU 450 may be powered up and may transmit a PRU 450 advertisement signal. In embodiment of the present disclosure, the PRU 450 may transmit the PRU 450 advertisement signal including manufacturer information. The PTU 400 may transmit a connection request signal in response to the PRU 450 advertisement signal.

In detail, the PTU 450 may enter the low power mode based on the load change during a beacon application interval and the receipt of the PRU advertisement signal. For example, the PTU 450 may enter the low power mode when the time for the load change and the time the PRU advertisement signal is received are below preset threshold values. When the PTU 400 enters the low power mode, the PTU 400 may transmit the connection request signal. In embodiment of the present disclosure, the PTU 400 may transmit the connection request signal including manufacturer information on the PTU 400. When the PTU 400 enters the low power mode, the PTU 400 may increase power applied to the resonator, and the applied power may be a sufficient amount to operate the communication module of the PRU 450. The PRU 450 may transmit a PRU static parameter signal in response to the receipt of the connection request signal. In embodiment of the present disclosure, the PRU 450 may transmit the PRU static parameter signal including the manufacturer information.

Table 8 illustrates an example of the PRU static parameter signal according to embodiments of the present disclosure, as follows.

TABLE 8

| Field | Octets | Description | Use | Units |
|---|---|---|---|---|
| Optional fields validity | 1 | Defines which optional fields are populated | Mandatory | |
| Protocol Revision | 1 | AirFuel Resonant Supported Revision | Mandatory | |
| RFU | 1 | Undefined | N/A | |
| PRU Category | 1 | Category of PRU | Mandatory | |
| PRU Information | 1 | Capabilities of PRU (bit field) | Mandatory | |
| Hardware rev | 1 | Revision of the PRU HW | Mandatory | |
| Firmware rev | 1 | Revision of the PRU SW | Mandatory | |
| PRECT_MAX | 1 | PRECT_MAX of the PRU | Mandatory | Category 1-5: mW × 100 Category 6+: mW × 1000 |
| VRECT_MIN_STATI | 2 | VRECT_MIN (static, first estimate) | Mandatory | mV |
| VRECT_HIGH_STATIC | 2 | VRECT_HIGH (static, first estimate) | Mandatory | mV |
| VRECT_SET | 2 | VRECT_SET | Mandatory | mV |
| PRU Company ID | 2 | PRU Company ID | Optional | |
| RFU | 4 | Undefined | N/A | |

As described above, for example, the manufacturer information (company ID) may have a two-octet length and may be set to be mandatory. The manufacturer information may be, for example, the unique identifier (ID) of an A4WP partner, and manufacturer IDs of 0x0000 and 0xFFFF may be reserved.

Returning to FIG. 14, the PTU 400 may transmit a PTU static parameter signal in response to the receipt of the PRU static parameter signal. In embodiments of the present disclosure, the PTU 400 may transmit the PTU static parameter including the manufacturer information.

Table 9 illustrates an example of the PTU static parameter signal according to embodiments of the present disclosure, as follows.

TABLE 9

| Field | Octets | Description | Use | Units |
|---|---|---|---|---|
| Optional fields validity | 1 | Defines which fields are valid | Mandatory | |
| PTU Power | 1 | Power of PTU | Mandatory | |
| PTU Max Source Impedance | 1 | Maximum source impedance of the PTU | Optional | |
| PTU Max Load Resistance | 1 | Maximum load resistance of the PTU | Optional | |
| RFU | 2 | Undefined | N/A | |
| PTU class | 1 | PTU class | Mandatory | Class 1-5 |
| Hardware rev | 1 | Revision of the PTU HW | Mandatory | |
| Firmware rev | 1 | Revision of the PTU SW | Mandatory | |
| Protocol Revision | 1 | AirFuel Resonant Supported Revision | Mandatory | |

TABLE 9-continued

| Field | Octets | Description | Use | Units |
|---|---|---|---|---|
| PTU Number of Devices Supported | 1 | Max Number of Devices | Mandatory | |
| PTU Company ID | 2 | PTU Company ID | Optional | |
| RFU | 4 | Undefined | N/A | |

As described above, for example, the manufacturer information (company ID) may have a two-octet length and may be set to be mandatory. The manufacturer information may be, for example, the unique ID of an A4WP partner, and manufacturer IDs of 0x0000 and 0xFFFF may be reserved.

As described above, for example, the manufacturer information (company ID) may have a two-octet length and may be set to be mandatory.

Returning to FIG. 14, the PRU 450 may transmit a PRU dynamic parameter signal, such as including the manufacturer information. The PTU 400 may enter the power transfer mode based on the receipt of the PRU dynamic parameter signal and may transmit a PRU control signal including the manufacturer information. The PRU 450 may transmit a PRU dynamic parameter signal to the PTU 400 periodically or at the detection of an event, may transmit a vendor command signal, and may receive an authority over whether to allow a function, such as a CCCD, from the PTU 400 and may transmit a vendor command signal associated with an allowed function. The PTU 400 may transmit a vendor command confirm signal corresponding to the vendor command signal. At least one of the vendor command signal and the vendor command confirm signal may be stated based on a text or a handle value. In addition, a handle value may be stated with an offset from the GATT primary service base handle value.

Figure 15:
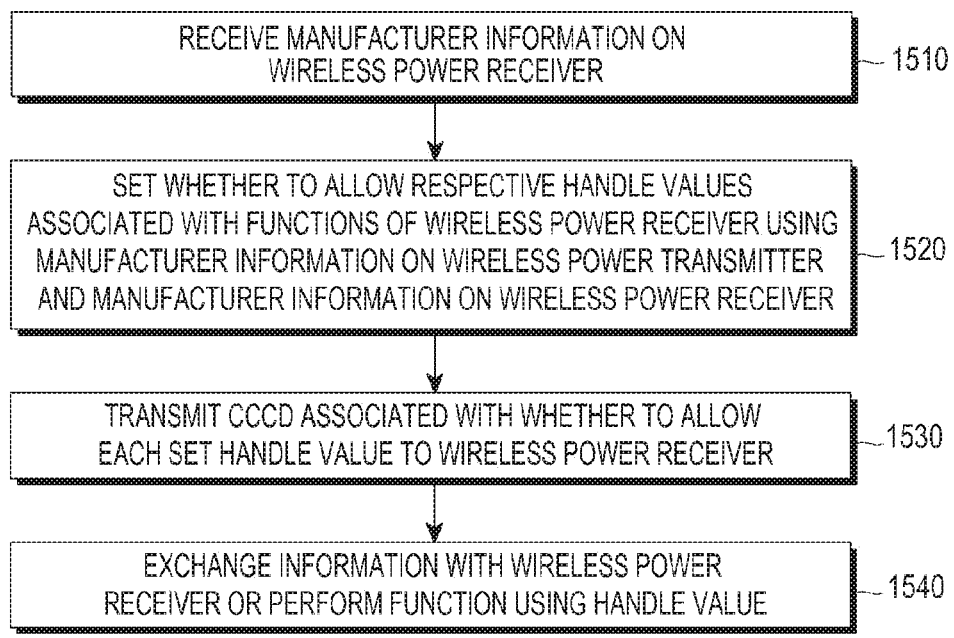
FIG. 15 illustrates a method for controlling a wireless power transmitter according to embodiments of the present disclosure.

FIG. 15 illustrates a method for controlling a wireless power transmitter according to embodiments of the present disclosure.

In step 1510, the wireless power transmitter may receive manufacturer information on a wireless power receiver. In step 1520, the wireless power transmitter may set whether to allow respective handle values associated with functions of the wireless power receiver using manufacturer information on the wireless power transmitter and the manufacturer information on the wireless power receiver. For example, the wireless power transmitter may allow handle values also supported by the wireless power transmitter among the handle values associated with the functions of the wireless power receiver.

In step 1530, the wireless power transmitter may transmit a CCCD associated with whether to allow each set handle value to the wireless power receiver. In embodiments of the present disclosure, the CCCD may include the handle value and a flag indicating whether to allow the handle value. In step 1540, the wireless power transmitter may exchange information with the wireless power receiver or may perform a function using the handle value. For example, when a function associated with a specific handle value is requested from the wireless power receiver, the wireless power transmitter may perform the function.

Figure 16:
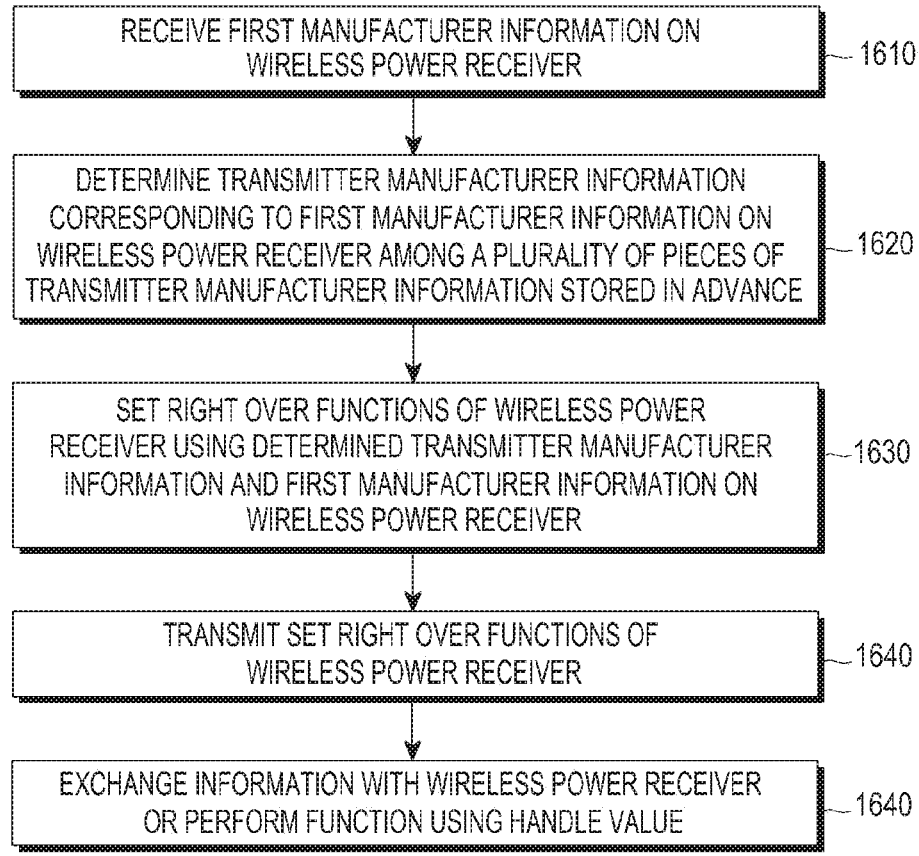
FIG. 16 illustrates a method for controlling a wireless power transmitter according to embodiments of the present disclosure.

FIG. 16 illustrates a method for controlling a wireless power transmitter according to embodiments of the present disclosure.

In step 1610, the wireless power transmitter may receive first manufacturer information on a wireless power receiver. In step 1620, the wireless power transmitter may determine transmitter manufacturer information corresponding to the first manufacturer information on the wireless power receiver among a plurality of pieces of transmitter manufacturer information stored in advance by the wireless power transmitter.

In step 1630, the wireless power transmitter may set an authority over functions of the wireless power receiver using the determined transmitter manufacturer information and the first manufacturer information on the wireless power receiver. Accordingly, the wireless power transmitter may set an authority over a function of even a wireless power receiver of a random manufacturer, which is supported by the manufacturer.

In step 1640, the wireless power transmitter may transmit the set authority over the functions of the wireless power receiver.

In step 1650, the wireless power transmitter may exchange information with the wireless power receiver or may perform a function using a handle value.

Figure 17:
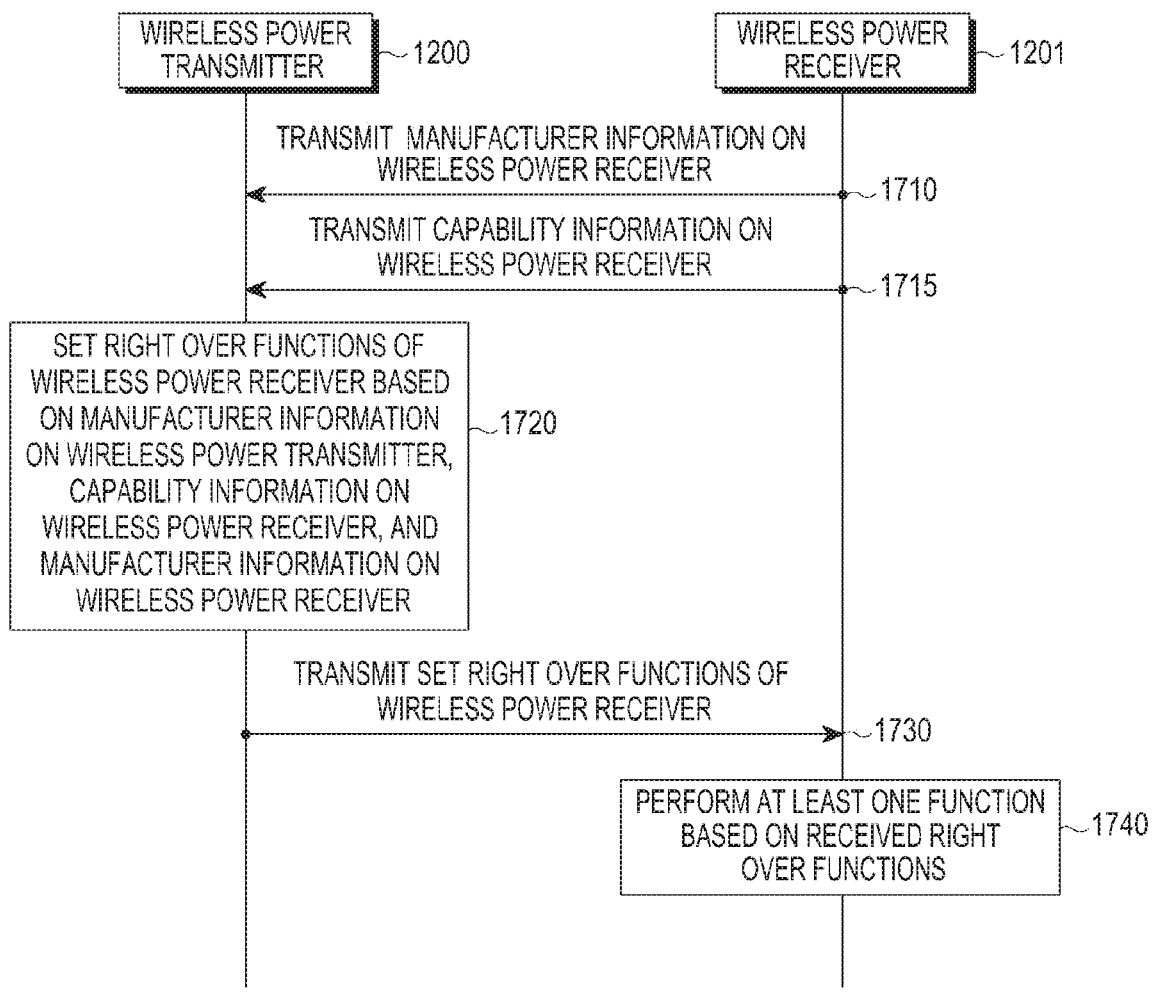
FIG. 17 illustrates operations of a wireless power transmitter and a wireless power receiver according to embodiments of the present disclosure.

FIG. 17 illustrates operations of a wireless power transmitter and a wireless power receiver according to embodiments of the present disclosure.

In step 1710, the wireless power receiver may transmit manufacturer information on the wireless power receiver. In step 1715, the wireless power receiver may transmit capability information on the wireless power receiver. The wireless power receiver may transmit the manufacture information and the capability information via the same signal or via different signals. The capability information may include firmware information, hardware information, and version information on the wireless power receiver.

In step 1720, the wireless power transmitter may set an authority over functions of the wireless power receiver based on manufacturer information on the wireless power transmitter, the capability information on the wireless power receiver, and the manufacturer information on the wireless power receiver. In step 1730, the wireless power transmitter may transmit the set authority over the functions of the wireless power receiver. In step 1740, the wireless power receiver may perform at least one function based on the received authority over the functions. Accordingly, the wireless power receiver may perform a function that may be performed with a capability.

Figure 18:
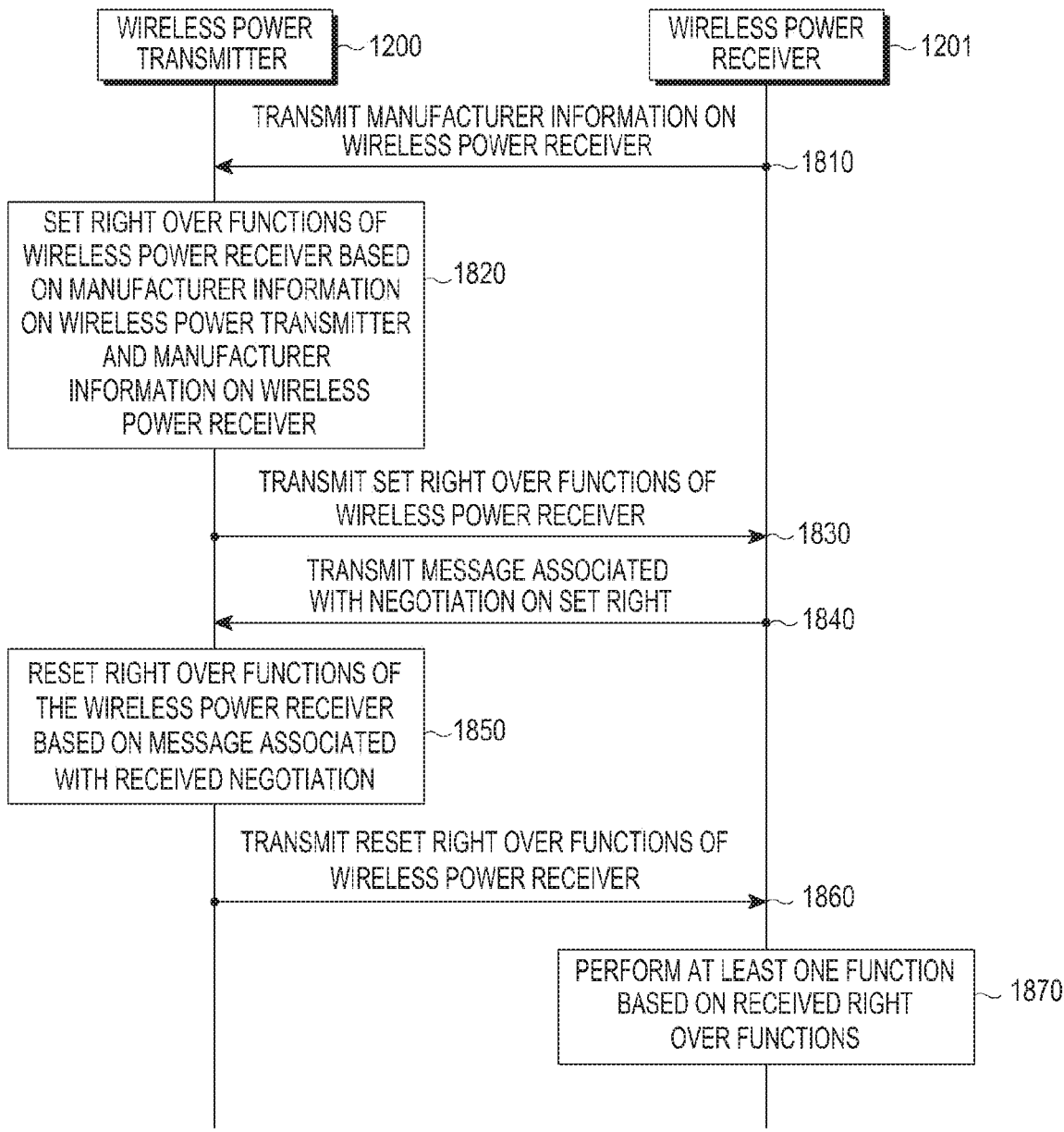
FIG. 18 illustrates operations of a wireless power transmitter and a wireless power receiver according to embodiments of the present disclosure.

FIG. 18 illustrates operations of a wireless power transmitter and a wireless power receiver according to embodiments of the present disclosure.

In step 1810, the wireless power receiver may transmit manufacturer information on the wireless power receiver. In step 1820, the wireless power transmitter may set an authority over functions of the wireless power receiver based on manufacturer information on the wireless power transmitter and the manufacturer information on the wireless power receiver.

In step 1830, the wireless power transmitter may transmit the set authority over the functions of the wireless power receiver. In step 1840, the wireless power receiver may transmit a signal associated with a negotiation on the set authority, such as a negotiation for a request to allow an unallowable function or to withdraw an allowed function.

In step 1850, the wireless power transmitter may reset the authority over the functions of the wireless power receiver based on a message associated with a received negotiation. For example, the wireless power transmitter may reset the authority by allowing a function that the wireless power transmitter is requested to allow or by not allowing an allowed function that the wireless power transmitter is requested to withdraw. In step 1860, the wireless power transmitter may transmit the reset authority over the functions of the wireless power receiver. In step 1870, the wireless power receiver may perform at least one function based on the received authority over the functions.

Figure 19:
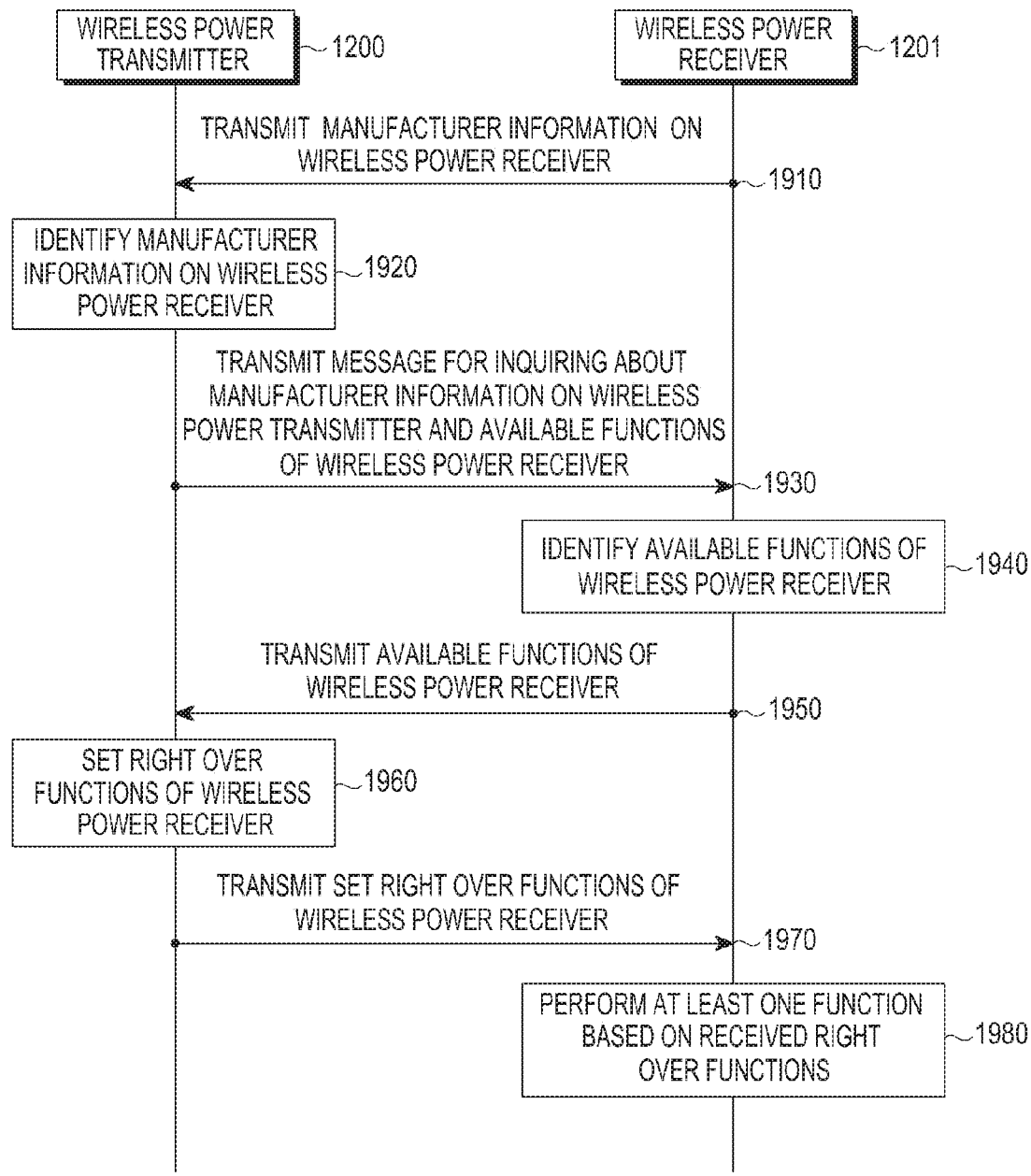
FIG. 19 illustrates operations of a wireless power transmitter and a wireless power receiver according to embodiments of the present disclosure.

FIG. 19 illustrates operations of a wireless power transmitter and a wireless power receiver according to embodiments of the present disclosure.

In step 1910, the wireless power receiver may transmit manufacturer information on the wireless power receiver. In step 1920, the wireless power transmitter may identify the manufacturer information on the wireless power receiver. In step 1930, the wireless power transmitter may transmit a message for inquiring about manufacturer information on the wireless power transmitter and available functions of the wireless power receiver.

In step 1940, the wireless power receiver may identify the available functions of the wireless power receiver, such as considering the manufacturer information on the wireless power transmitter. When the wireless power receiver is capable of performing quick charging but the wireless power transmitter is manufactured by a manufacturer that does not provide a quick charging function, the quick charging function may be excluded from the available functions.

In step 1950, the wireless power receiver may transmit the available functions of the wireless power receiver.

In step 1960, the wireless power transmitter may set an authority over the functions of the wireless power receiver based on received information on the available functions.

In step 1970, the wireless power transmitter may transmit the set authority over the functions of the wireless power receiver. In step 1980, the wireless power receiver may perform at least one function based on the received authority over the functions.

Hereinafter, details on wireless charging will be described more specifically.

Wireless charging is based on wireless power transmission and reception and refers to a system that enables an electronic device (for example, a cellular phone) to charge a battery without being connected to an additional charging connector. Wireless charging may enhance the portability of an electronic device due to not needing an additional external device (for example, a TA) to charge the electronic device and may increase waterproofing due to the removal of a connector to connect the electronic device to an external device.

A wireless power transmission device may transfer power to a wireless power reception device using one or more of inductive coupling based on electromagnetic induction, which occurs by a wireless power signal, and electromagnetic resonance coupling based on electromagnetic resonance, which occurs by a wireless power signal with a specific frequency.

An electromagnetic induction-based wireless power transmission method is a technique for wirelessly transmitting power using a primary coil and a secondary coil, in which a changing electromagnetic field created in one coil by electromagnetic induction induces a current in the other coil, thereby transferring power.

An electromagnetic resonance coupling-based wireless power transmission method refers to a technique in which a wireless power signal transmitted from a wireless power transmission device causes electromagnetic resonance in an electronic device, by which power is transferred from the wireless power transmission device to the electronic device.

In a power transfer of a wireless power transmission device using an inductive coupling scheme, when the strength of a current flowing in a primary coil in the wireless power transmission device is changed, the current causes a change in an electromagnetic field passing through the primary coil. The changed electromagnetic field causes an induced electromotive force at a secondary coil in a wireless power reception device. The efficiency of wireless power transfer by the inductive coupling scheme is less affected by frequency characteristics but is affected by an alignment and the distance between the wireless power transmission device and the wireless power reception device that include the respective coils. The wireless power transmission device may be configured to include an interface surface in a flat surface form for wireless power transfer by inductive coupling.

One or more electronic devices may be placed on the upper side of the interface surface, and a transmission coil may be mounted on the lower side of the interface surface. An alignment marker that indicates a position for the electronic device to be placed may be formed on the upper side of the interface surface. The alignment marker may indicate a position for the electronic device to form a proper alignment between the transmission coil mounted on the lower side of the interface surface and the reception coil. In some embodiments, the alignment marker may simply be marks formed in a protruding structure to indicate a position for the electronic device. In some embodiments, the alignment marker may be formed as a magnetic member, such as a magnet, mounted on the lower side of the interface surface, which guides the coils to form a proper alignment through attraction to a magnetic member having the opposite pole mounted in the electronic device.

The wireless power transmission device or the wireless power reception device may output feedback on an aligned state to improve charging efficiency. The feedback may include a voice message, a predetermined sound effect, vibrations, a text message, or a video displaying an illustration of correcting an alignment through a display.

The wireless power transmission device may be formed to include one or more transmission coils, and may selectively use some coils in proper alignment with the reception coil of the electronic device, among the one or more transmission coils, to enhance power transmission efficiency. The coils may have a movable form.

The wireless power transmission device may include a driver that moves the transmission coils such that the distance between the center of the transmission coils and the center of the reception coil of the electronic device is within a certain range, or rotates the transmission coils such that the centers of the transmission coils and the reception coil overlap when the position of the wireless power reception device is determined through a position detector. The wireless power transmission device may further include a multiplexer that connects and disconnects some coils of the one or more transmission coils. When the position of the wireless power reception device placed on the upper side of the interface surface is detected, the wireless power transmission device may control the multiplexer to connect coils that may be inductively coupled with the reception coil of the wireless power reception device among the one or more transmission coils in view of the detected position.

The magnetic resonance scheme is a technique in which, when a wireless power transmission device that transmits power and a wireless power reception device that receives power are allowed to have the same resonance frequency and thus the wavelengths of the two frequencies are equal, energy is transferred intensively only to a reception coil designed with the resonance frequency. This scheme enables up to several-meter power transfer in accordance with standards for the protection of humans from electromagnetic fields and needs no alignment with the wireless power reception device, yet exhibits lower power transmission efficiency than the magnetic induction scheme and may be affected by surroundings.

A power converter of the wireless power transmission device may be configured to include one or more transmission coils and resonance forming circuits connected to the respective transmission coils. The power converter may further include a multiplexer that connects and disconnects some coils of the one or more transmission coils. The one or more transmission coils may be set to have the same resonance frequency, or some of the one or more transmission coils may be set to have different resonance frequencies, which may be determined depending on the inductances and/or capacitances of the resonance forming circuits respectively connected to the one or more transmission coils.

Figure 20:
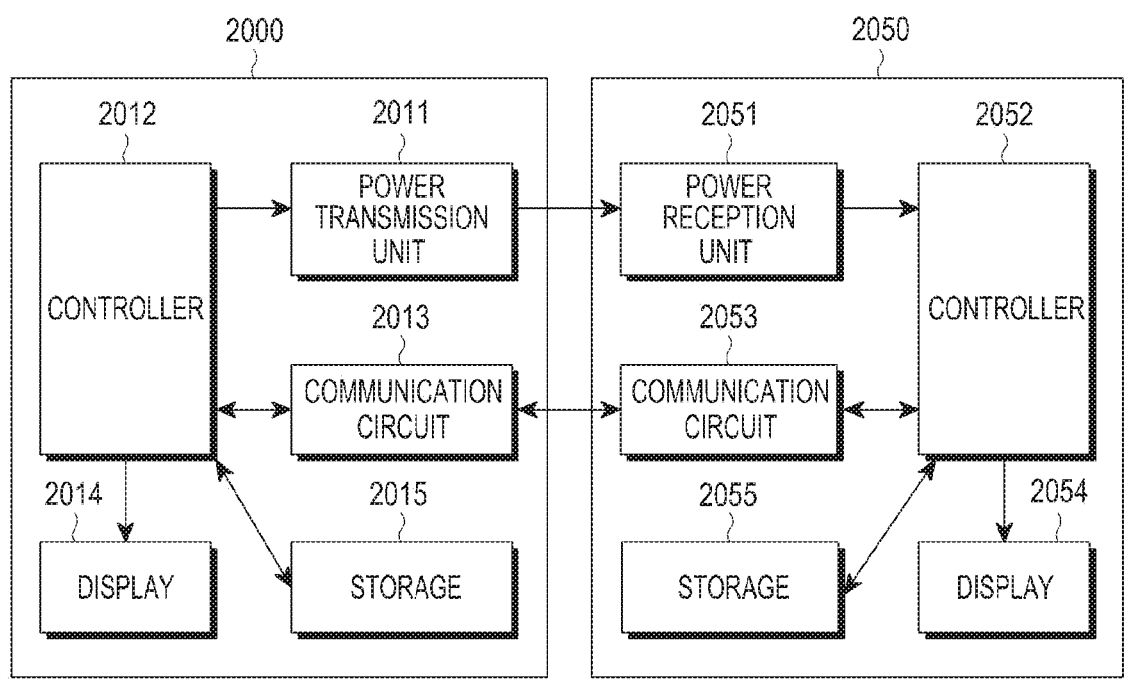
FIG. 20 illustrates a wireless power transmission device and a wireless power reception device according to an embodiment of the present disclosure.

FIG. 20 illustrates a wireless power transmission device and a wireless power reception device according to an embodiment of the present disclosure.

As illustrated in FIG. 20, the wireless power transmission device 2000 may include at least one of a power transmission unit 2011, a controller 2012, a communication circuit 2013, a display 2014, and a storage 2015.

The power transmission unit 2011 may wirelessly supply power to the wireless power reception device 2050 in an AC waveform and may convert power of a DC waveform into power of an AC waveform using an inverter to supply the power of the AC waveform. The power transmission unit 2011 may be provided in the form of a built-in battery or a power receiving interface that receives power from the outside to supply power to another component.

The controller 2012 may control overall operations of the wireless power transmission device 2000, such as by using an algorithm, a program, or an application required for control, which is stored in the storage 2015. The controller 2012 may be provided as a CPU, a microprocessor, or a minicomputer, and may display a state of the wireless power reception device 2050 on the display 2014 based on a message received from the wireless power reception device 2050 through the communication circuit 2013.

The communication circuit 2013 may communicate with the wireless power reception device 2050 using a predetermined scheme, and may receive power information from the wireless power reception device 2050. For example, the power information may include at least one of the residual battery amount, the charging numbers, the usage, the battery capacity, and the battery percentage of the wireless power reception device 2050.

The communication circuit 2013 may transmit a charging function control signal to control a charging function of the wireless power reception device 2050. The charging function control signal may control a power reception unit 2051 of a specific wireless power reception device 2050 to enable or disable a charging function, and may include information associated with power adjustment or power control commands to handle the occurrence of abnormal conditions according to embodiments of the present disclosure.

The wireless power reception device 2050 may include at least one of a power reception unit 2051, a controller 2052, a communication circuit 2053, a display 2054, and a storage 2055.

The power reception unit 2051 may wirelessly receive power transmitted from the wireless power transmission device 2000.

The controller 2052 may control overall operations of the wireless power reception device 2050, such as by using an algorithm, a program, or an application required for control, which is readable from the storage 2055. The controller 2052 may be provided as a CPU, a microprocessor, or a minicomputer. The controller 2052 may control the display 2054 to display a state of the wireless power reception device 2050.

The communication circuit 2053 may communicate with the wireless power transmission device 2000 using a predetermined scheme. The communication circuit 2053 may transmit/receive power information or a control signal to/from the wireless power transmission device 2000. The power information may include at least one of the residual battery amount, the charging numbers, the usage, the battery capacity, and the battery percentage of the wireless reception device 2050.

The communication circuit 2053 may receive a charging function control signal to control a charging function of the wireless power reception device 2050. The charging function control signal may be a control signal that controls a power reception unit 2051 of a specific wireless power reception device 2050 to enable or disable a charging function. The charging function control signal may include information associated with power adjustment or power control commands to handle the occurrence of abnormal conditions according to embodiments of the present disclosure.

Figure 21A:
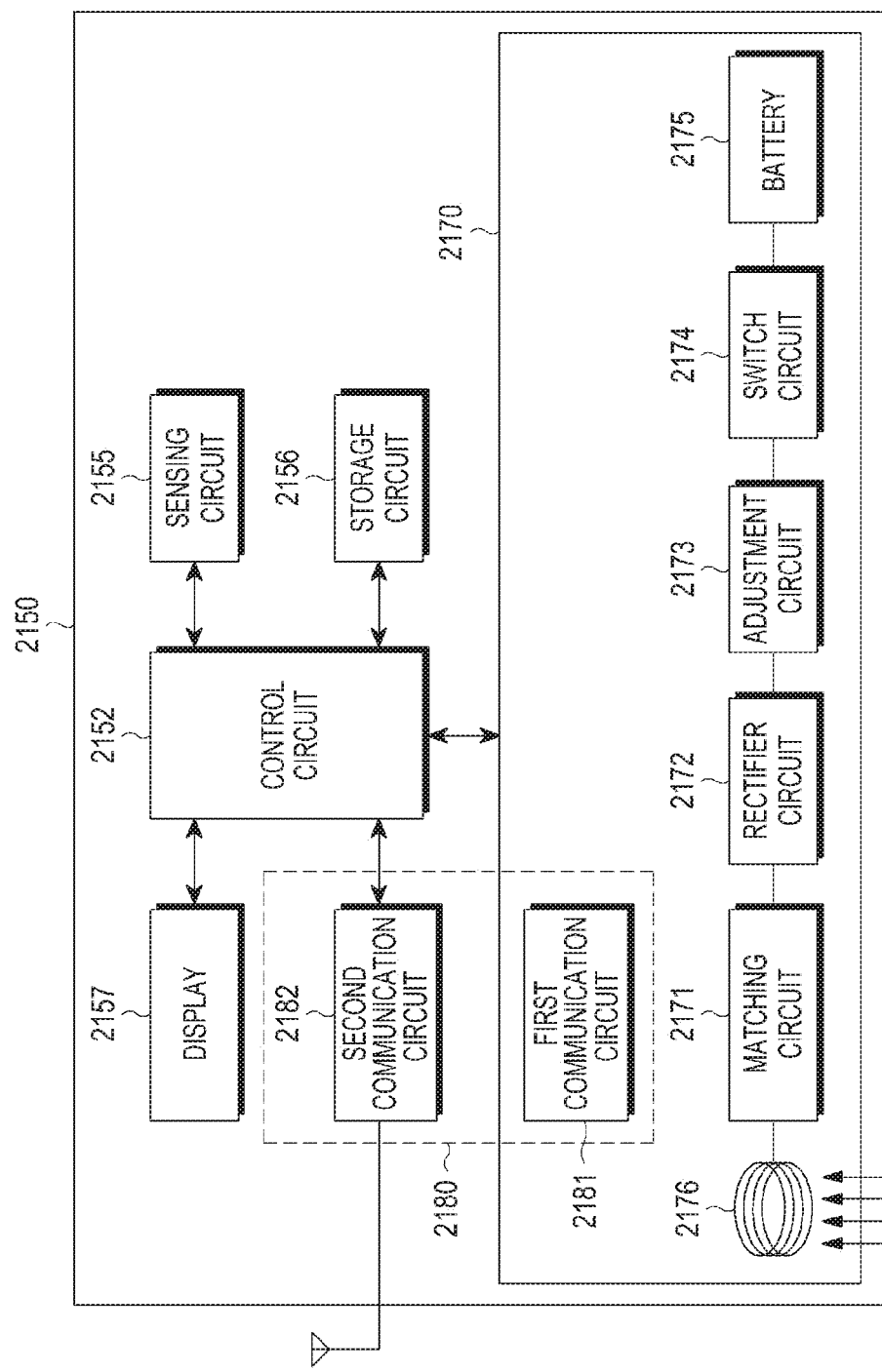
FIG. 21A and FIG. 21B illustrate a block diagram of a wireless power transmission device and a wireless power reception device according to embodiments of the present disclosure.
Figure 21B:
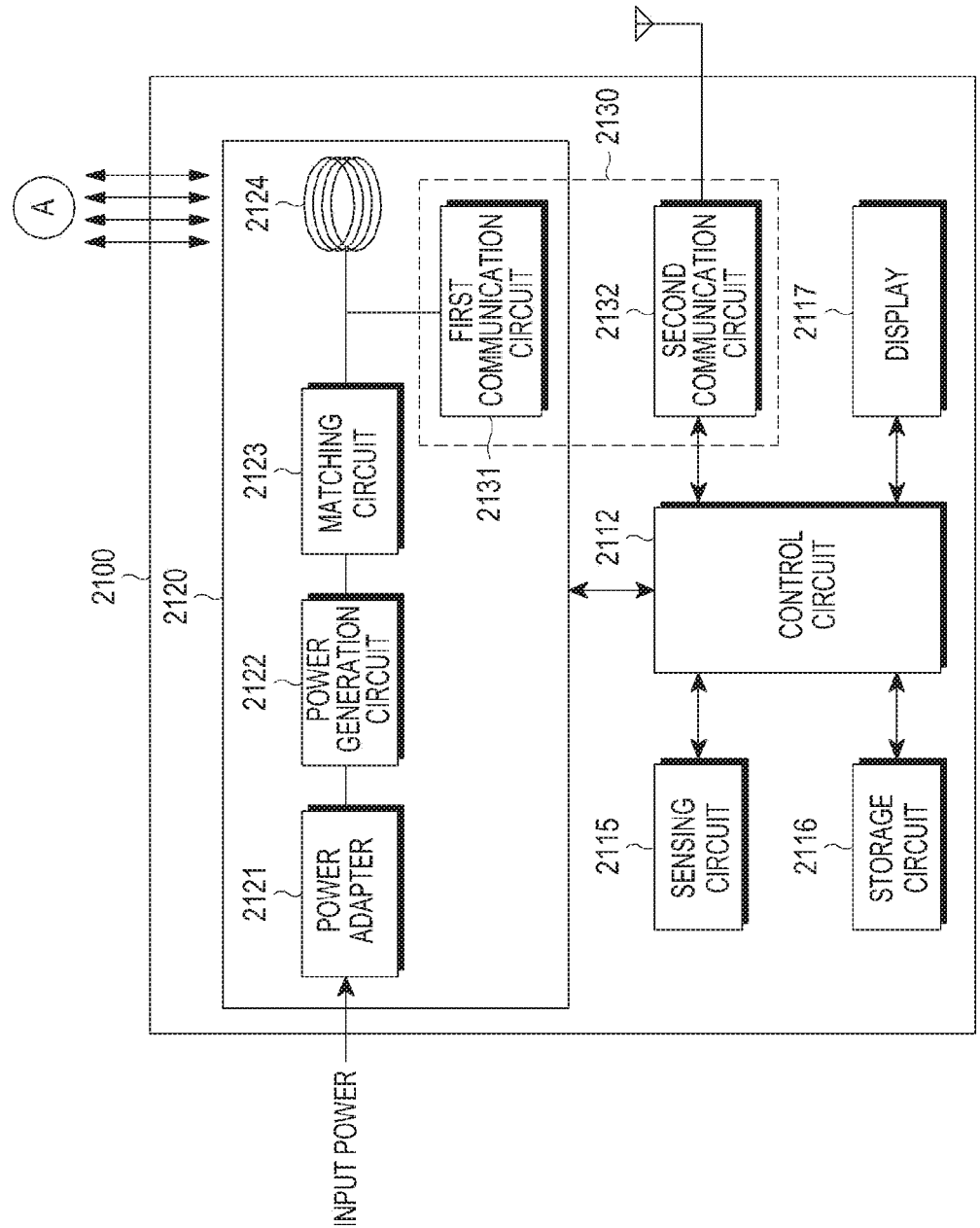

FIG. 21A and FIG. 21B illustrate a block diagram of illustrating a wireless power transmission device and a wireless power reception device according to embodiments of the present disclosure.

The wireless power transmission device 2100 may include a power transmission circuit 2120, a control circuit 2112, a communication circuit 2130, a sensing circuit 2115, and a storage circuit 2116. The wireless power reception device 2150 may include a power reception circuit 2170, a control circuit 2152, a communication circuit 2180, a sensing circuit 2155, and a display 2157.

Referring to FIG. 21A and FIG. 21B, the power transmission circuit 2120 may provide power to the wireless power reception device 2150. The power transmission circuit 2120 may include a power adapter 2121, a power generation circuit 2122, a matching circuit 2123, a conductive pattern (for example, a coil) 2124, and a first communication circuit 2131. The power transmission circuit 2120 may be configured to wirelessly transmit power to the wireless power reception device 2150 through the conductive pattern 2124. The power transmission circuit 2120 may be supplied with power in a DC or AC waveform from the outside and may supply the supplied power in an AC waveform to the wireless power reception device 2150.

The power adapter 2121 may be supplied with AC or DC power from the outside or may receive a power signal of a battery device to output DC power having a set voltage value. The voltage value of the DC power output from the power adapter 2121 may be controlled by the control circuit 2112. The DC power output from the power adapter 2121 may be output to the power generation circuit 2122.

The power generation circuit 2122 may convert a DC current output from the power adapter 2121 into an AC current to output the AC current, and may include an amplifier. When the DC current input through the power adapter 2121 has a gain less than a set gain, the power generation circuit 2122 may amplify the DC current to have a set gain using the amplifier. The power generation circuit 2122 may include a circuit that converts the DC current input from the power adapter 2121 into an AC based on a control signal input from the control circuit 2112. For example, the power generation circuit 2122 may convert the DC current into AC through an inverter. In addition, the power generation circuit 2122 may include a gate drive device that may convert the DC current into AC by performing on/off control. Furthermore, the power generation circuit 2122 may generate AC power signal through a wireless power generator (for example, an oscillator).

The matching circuit 2123 may perform impedance matching. For example, when the AC signal output from the power generation circuit 2122 is transferred to the conductive pattern 2124, an electromagnetic field may be formed in the conductive pattern 2124 by the AC signal. The matching circuit 2123 may adjust impedance to adjust the frequency band of the formed electromagnetic signal. The matching circuit 2123 may adjust the impedance to control output power, which is transmitted to the wireless power reception device 2150 through the conductive pattern 2124, to have high efficiency or high output. The matching circuit 2123 may adjust the impedance based on control by the control circuit 2112. The matching circuit 2123 may include at least one of an inductor (for example, a coil), a capacitor, and a switch device. The control circuit 2112 may control a state of a connection to at least one of the inductor and the capacitor through the switch device, and the matching circuit 2123 may perform impedance matching accordingly.

The conductive pattern 2124 may form a magnetic field to induce a current in the wireless power reception device 2150 when a current is applied to the conductive pattern 2124. The first communication circuit 2131 (for example, a resonance circuit) may perform communication (for example, data communication) in an in-band scheme using electromagnetic waves generated by the conductive pattern 2124.

The sensing circuit 2115 (for example, a sensor module) may sense a variation in current/voltage applied to the conductive pattern 2124 of the power transmission circuit 2120, which may transmit power with an amount that may change according to the variation in current/voltage applied to the conductive pattern 2124. The sensing circuit 2115 may sense a variation in the temperature of the wireless power transmission device 2100, and may include at least one of a current/voltage sensor and a temperature sensor.

The control circuit 2112 may control the power transmission circuit 2120 to wirelessly transmit power to the wireless power reception device 2150, and may control the communication circuit 2130 to wirelessly receive information from the wireless power reception device 2150.

According to one embodiment, the received information may include at least one of charging setting information on a battery state of the wireless power reception device 2150, power amount control information on the adjustment of the amount of power transmitted to the wireless power reception device 2150, environment information on a charging environment of the wireless power reception device 2150, and time information on the wireless power reception device 2150.

The charging setting information may be on the battery state of the wireless power reception device 2150 at a time for wireless charging between the wireless power transmission device 2100 and the wireless charging reception device 2150. For example, the charging setting information may include at least one of the full battery capacity, residual battery amount, charging numbers, battery usage, charging mode, charging method, and wireless reception frequency band of the wireless power reception device 2150.

The power amount control information may be for controlling the initial amount of transmitted power according to a variation in the amount of power charged in the wireless power reception device 2150 during wireless charging between the wireless power transmission device 2100 and the wireless power reception device 2150.

The environment information may be on a charging environment of the wireless power reception device 2150 measured by the sensing circuit 2155 of the wireless power reception device 2150 and may include, for example, at least one of temperature data including at least one of the internal temperature and the external temperature of the wireless power reception device 2150, illumination intensity data indicating the ambient illumination intensity (brightness) of the wireless power reception device 2150, and sound data indicating an ambient sound (noise) of the wireless power reception device 2150.

The control circuit 2112 may control to generate power to be transmitted to the wireless power reception device 2150 or to transmit the power based on the charging setting information among the received pieces of information. The control circuit 2112 may determine or change the amount of power transmitted to the wireless power reception device 2150 based on at least some (for example, at least one of the power amount control information, the environment information, and the time information) of the received pieces of information, and may control the matching circuit 2123 to change the impedance.

A display 2117 may display overall information associated with a state of the wireless power transmission device 2100, environment information, and a charging state.

The communication circuit 2130 may communicate with the wireless power reception device 2150 using a predetermined scheme. The communication circuit 2130 may perform data communication with the communication circuit 2180 of the wireless power reception device 2150. For example, the communication circuit 2130 may unicast, multicast, or broadcast a signal.

According to one embodiment, the communication circuit 2130 may include at least one of the first communication circuit 2131, which is configured with the power transmission circuit 2120 in hardware and enables the wireless power transmission device 2100 to perform communication in the in-band scheme, and a second communication circuit 2132, which is configured as different hardware from the power transmission circuit 2120 and enables the wireless power transmission device 2100 to perform communication in an out-of-band scheme.

According to one embodiment, when the communication circuit 2130 includes the first communication circuit 2131 that enables communication in the in-band scheme, the first communication circuit 2131 may receive the frequency and the signal level of an electromagnetic signal received through the conductive pattern 2124 of the power transmission circuit 2120. The control circuit 2112 may decode the frequency and the signal level of the received electromagnetic signal to extract information received from the wireless power reception device 2150.

The first communication circuit 2131 may transmit information on the wireless power transmission device 2100 to the wireless power reception device 2150 by applying a signal on the information on the wireless power transmission device 2100, which is to be transmitted to the wireless power reception device 2150, to the conductive pattern 2124 of the power transmission circuit 2120 or by adding the signal on the information on the wireless power transmission device 2100 to an electromagnetic signal generated by applying a signal output from the matching circuit 2123 to the conductive pattern 2124. The control circuit 2112 may control to output the information on the wireless power transmission device 2100 by changing a state of a connection to at least one of the inductor and the capacitor of the matching circuit 2123 through on/off control using the switch device included in the matching circuit 2123.

According to one embodiment, when the communication circuit 2130 includes the second communication circuit 2132 that enables communication in the out-of-band scheme, the second communication circuit 2132 may communicate with the communication circuit 2180 (for example, a second communication circuit 2182) of the wireless power reception device 2150 using near field communication (NFC), ZigBee®, infrared communication, visible light communication, Bluetooth®, or BLE.

The aforementioned communication schemes of the communication circuit 2130 are merely illustrative examples, and the present disclosure is not limited thereto. In FIG. 21A, the wireless power reception device 2150 may include the power reception circuit 2170, the control circuit 2152, the communication circuit 2180, the sensing circuit 2155, and the display 2157. The power reception circuit 2170 of the wireless power reception device 2150 may receive power from the power transmission circuit 2120 of the wireless power transmission device 2100, and may be provided in the form of a built-in battery or a power receiving interface that receives power from the outside. The power reception circuit 2170 may include a matching circuit 2171, a rectifier circuit 2172, an adjustment circuit 2173, a switch circuit 2174, a battery 2175, and a conductive pattern 2176.

The power reception circuit 2170 may receive, through the conductive pattern 2176, wireless power in the form of electromagnetic waves that are generated corresponding to a current/voltage applied to the conductive pattern 2124 of the power transmission circuit 2120. For example, the power reception circuit 2170 may receive power using an induced electromotive force formed in the conductive pattern 2124 of the power transmission circuit 2120 and the conductive pattern 2176 of the power reception circuit 2170.

The matching circuit 2171 may perform impedance matching. For example, the power transmitted through the conductive pattern 2124 of the wireless power transmission device 2100 is transferred to the conductive pattern 2176, thereby forming an electromagnetic field. The matching circuit 2171 may adjust impedance to adjust the frequency band of the formed electromagnetic signal, and may control input power, which is received from the wireless power transmission device 2100 through the conductive pattern 2176, to have high efficiency or high output by impedance adjustment. The matching circuit 2171 may adjust the impedance based on control by the control circuit 2152. The matching circuit 2171 may include at least one of an inductor (for example, a coil), a capacitor, and a switch device. The control circuit 2152 may control a state of a connection to at least one of the inductor and the capacitor through the switch device, and the matching circuit 2171 may perform impedance matching accordingly.

The rectifier circuit 2172 may rectify the wireless power received through the conductive pattern 2176 into a DC form and may be configured, for example, as a bridge diode.

The adjustment circuit 2173 may convert the rectified power into a set gain, and may include a DC/DC converter. For example, the adjustment circuit 2173 may convert the rectified power so that the voltage at the output end is 5 V.

A minimum voltage value and a maximum voltage value that may be applied to the input end of the adjustment circuit 2173 may be preset.

The switch circuit 2174 may connect the adjustment circuit 2173 and the battery 21751, and may be maintained in an on/off state according to control by the control circuit 2152.

The battery 2175 may be charged by being supplied with power input from the adjustment circuit 2173.

The sensing circuit 2155 may sense a change in the state of power received by the wireless power reception device 2150. For example, the sensing circuit 2155 may periodically or aperiodically measure the value of a current/voltage transmitted to the conducive pattern 2176 using a current/voltage sensor. The wireless power reception device 2150 may calculate the amount of power received by the wireless power reception device 2150 based on the measured current/voltage.

According to one embodiment, the sensing circuit 2155 may sense a change in the charging environment of the wireless power reception device 2150. For example, the sensing circuit 2155 may periodically or aperiodically measure at least one of the internal temperature and the external temperature of the wireless power reception device 2150 using a temperature sensor.

The display 2157 may display overall information on a charging state of the wireless power reception device 2150, such as the full battery capacity, the residual battery amount, the battery charging amount, the battery usage, and the estimated charging time of the wireless power reception device 2150.

The communication circuit 2180 may communicate with the wireless power transmission device 2100 in a predetermined scheme, and may perform data communication with the communication circuit 2130 of the wireless power transmission device 2100. The communication circuit 2180 may operate similarly to, or the same as, the communication circuit 2130 of the wireless power transmission device 2100.

The control circuit 2152 may transmit, to the wireless power transmission device 2100 through the communication circuit 2180, the charging setting information for receiving a needed power amount based on the information on the battery state of the wireless power reception device 2150. For example, when the wireless power transmission device 2100 capable of transmitting wireless power is identified, the control circuit 2152 may transmit the charging setting information for receiving the needed power amount to the wireless power transmission device 2100 through the communication circuit 2180 based on at least one of the full battery capacity, the residual battery amount, the charging numbers, the battery usage, the charging mode, the charging method, and the wireless reception frequency band of the wireless power reception device 2150.

The control circuit 2152 may transmit, to the wireless power transmission device 2100 through the communication circuit 2180, the power amount control information for controlling the amount of power received from the wireless power transmission device 2100 according to a variation in the amount of power charged in the wireless power reception device 2150.

The control circuit 2152 may transmit the environment information based on a change in the charging environment of the wireless power reception device 2150 to the wireless power transmission device 2100. For example, when the value of temperature data measured by the sensing circuit 2155 is a set temperature reference value or higher, the control circuit 2152 may transmit the measured temperature data to the wireless power transmission device 2100.

Although FIG. 21A and FIG. 21B illustrate that the wireless power transmission device 2100 and the wireless power reception device 2150 include only the power transmission circuit 2120 and the power reception circuit 2170, respectively, the wireless power transmission device 2100 and the wireless power reception device 2150 may each include both the power transmission circuit 2120 and the power reception circuit 2170. Accordingly, the wireless power transmission device 2100 and the wireless power reception device 2150 according to embodiments of the present disclosure may function as both a power transmission device and a power reception device.

Figure 22:
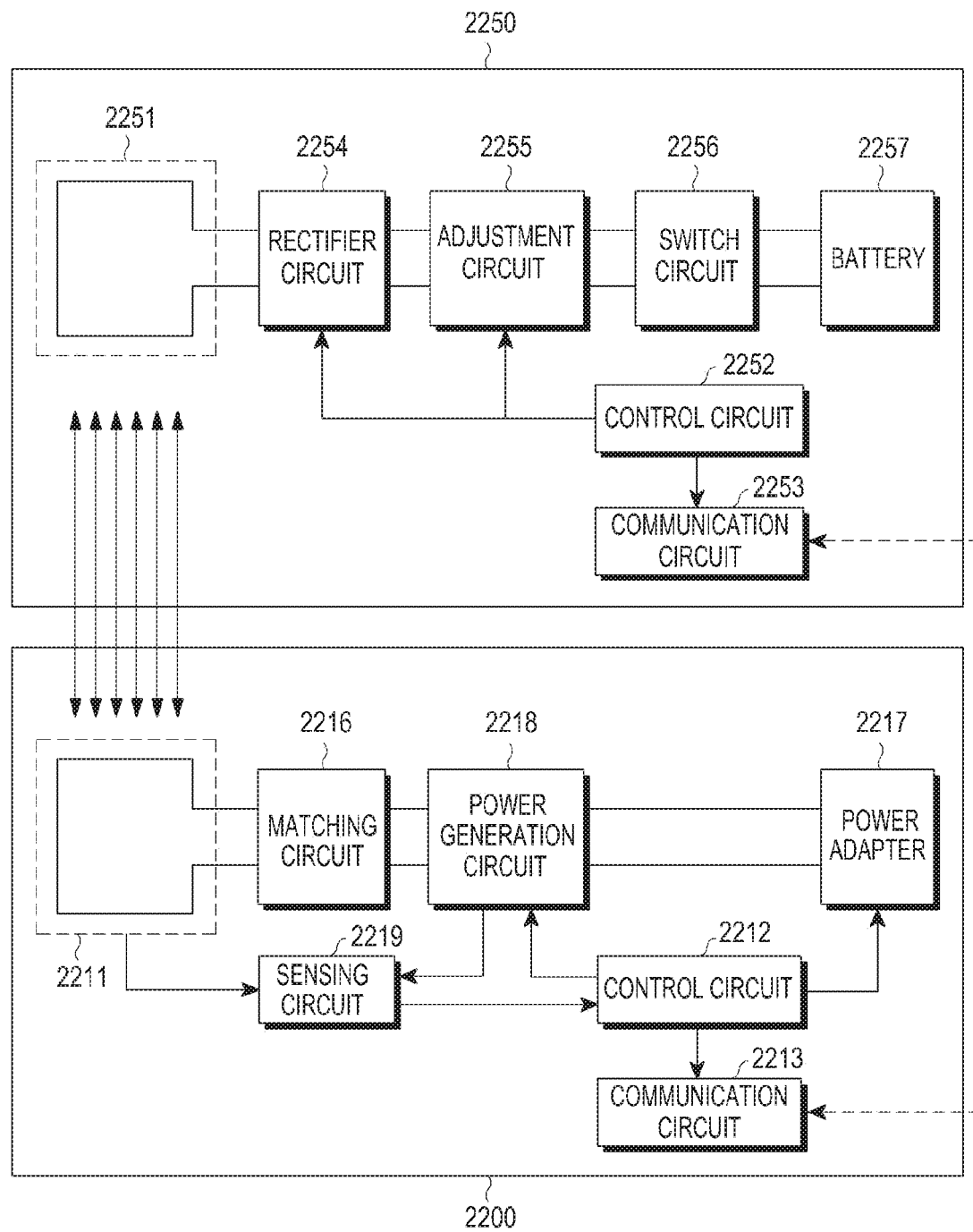
FIG. 22 illustrates a wireless power transmission device and a wireless power reception device according to an embodiment of the present disclosure.

FIG. 22 illustrates a wireless power transmission device and a wireless power reception device according to an embodiment of the present disclosure.

As illustrated in FIG. 22, the wireless power transmission device 2200 may include at least one of a Tx resonator 2211, a control circuit 2212 (for example, an MCU), a communication circuit 2213 (for example, an out-of-band signaling circuit), a matching circuit 2216, a power adapter 2217, a power generation circuit 2218, and a sensing circuit 2219. The wireless power reception device 2250 may include at least one of an Rx resonator 2251, a control circuit 2252, a communication circuit 2253, a rectifier circuit 2254, an adjustment circuit 2255, a switch circuit 2256, and a battery 2257.

The power adapter 2217 may output DC power with a set voltage value which may be controlled by the control circuit 2212.

The power generation circuit 2218 may receive a DC current from the power adapter 2217, may amplify the DC current into a preset gain, may convert the DC power into AC power based on a signal input from the control circuit 2212, and may output AC power. For example, the power generation circuit 2218 may include an inverter and may convert the DC current into AC power using the inverter.

The matching circuit 2216 may perform impedance matching. For example, the matching circuit 2216 may adjust impedance viewed from the matching circuit 2216 to control output power to have high efficiency or high output, may adjust impedance based on control by the controller 2122, and may include at least one of a coil and a capacitor. The control circuit 2212 may control a state of a connection to at least one of the coil and the capacitor, and the matching circuit 2216 may perform impedance matching accordingly. The wireless power reception device 2250 may include a matching circuit that performs similar or equivalent operations to those of the matching circuit 2216 of the wireless power transmission device 2200.

The sensing circuit 2219 may sense a load change of the wireless power reception device 2250 through the Tx resonator 2211a or the power generation circuit 2218 and may provide a sensing result to the control circuit 2212. The wireless power reception device 2250 may include a sensing circuit that performs similar or equivalent operations to those of the sensing circuit 2219 of the wireless power transmission device 2200.

The Tx resonator 2211 may transmit input AC power to the Rx resonator 2251. The Tx resonator 2211 and the Rx resonator 2251 may be configured as resonance circuits having the same resonance frequency, such as 6.78 MHz. The Tx resonator 2211 may include a coil or a capacitor to convert the input AC power into electromagnetic waves with the same resonance frequency. The Rx resonator 2251 may receive power for charging.

The communication circuit 2213 may communicate with the communication circuit 2253 of the wireless power reception device 2250. For example, the wireless power transmission device 2200 may communicate with the wireless power reception device 2250 bi-directionally in 2.4 GHz (by WiFi, ZigBee, or Bluetooth (BT)/BLE).

The rectifier circuit 2254 may rectify wireless power received from the Rx resonator 2251 into DC power and may be configured, for example, as a bridge diode.

The adjustment circuit 2255 may convert the rectified power into a preset gain, so that the voltage at the output end is 5 V for example. A voltage threshold (for example, a minimum value and a maximum value) that may be applied to the input end of the adjustment circuit 2255 may be set. The adjustment circuit 2255 may include a DC/DC converter.

The switch circuit 2256 may connect the adjustment circuit 2255 and the battery 2257, and may be maintained in an on or off state according to control by the control circuit 2252. The switch circuit 2256 may be omitted. When the switch circuit 2256 is in the on state, the battery 2257 may store converted power input from the adjustment circuit 2255.

The control circuit 2212 may control components included in the wireless power transmission device 2200, such as by controlling to start or end wireless power transmission to the power adapter 2217.

Figure 23:
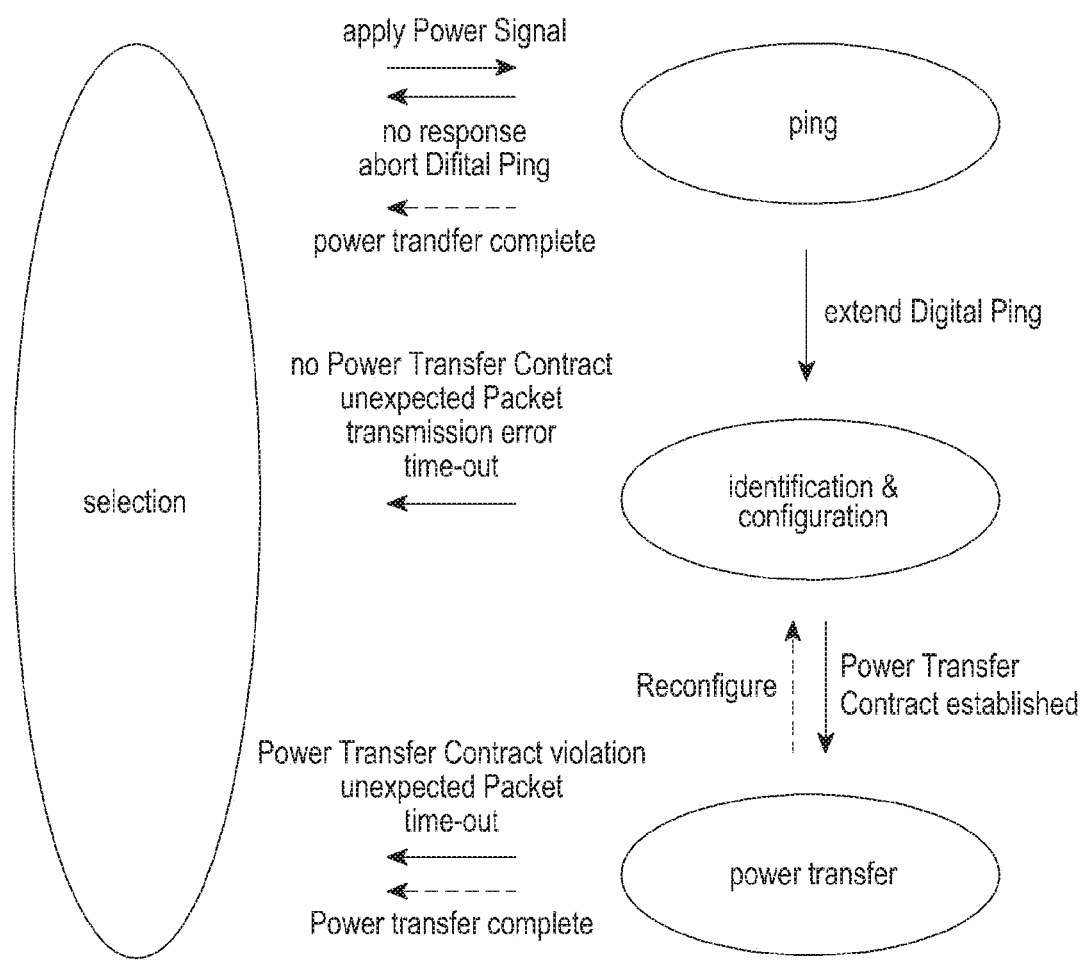
FIG. 23 is a conceptual view illustrating operation phases according to embodiments of the present disclosure.

FIG. 23 is a conceptual view illustrating operation phases according to embodiments of the present disclosure.

From the viewpoint of system control, power transmission from a wireless power transmission device to a wireless power reception device has four operation phases, which may be divided into a selection phase, a ping phase, an identification and configuration phase, and a power transfer phase.

Selection Phase

In the selection phase, the wireless power transmission device may perform an operation for determining whether an object is present in or is removed from a wireless power transmission range (sensing zone). The sensing zone refers to an area within which an object affects characteristics of power from the wireless power transmission device, which may be an interface surface of the wireless power transmission device in the inductive scheme and may be a power transmission range in the resonance scheme.

In the selection phase, a process for detecting a wireless power reception device is a process in which a power converter of the wireless power transmission device detects a variation in power amount for forming a wireless power signal to identify the presence of an object within a range, instead of receiving a response from a wireless power reception device using a power control message. Therefore, the detection process in the selection phase may be referred to as an analog ping in terms of detecting an object using a wireless power signal.

The wireless power transmission device in the selection phase may detect an object entering and leaving the sensing zone, and may attempt to divide objects in the sensing zone into a wireless power reception device to which power can be wirelessly transferred and other objects, such as a key or a coin. When the power transmission device does not receive sufficient information, the power transmission device may repeat the analog ping and then may enter the identification and configuration phase.

In power transmission according to the inductive coupling scheme, the wireless power transmission device may detect the position of a wireless power reception device placed on the upper side of the interface surface. When the power transmission device includes one or more transmission coils or supports free positioning, the power transmission device may attempt to determine the position of an object. The power transmission device may identify whether a response to a detection signal is transmitted from the object using the coils in the ping phase, or may subsequently enter the identification phase to perform a method of identifying whether identification information is transmitted from the object.

The wireless power transmission device may determine a coil to use for wireless power transmission based on information (the position of the wireless power reception device) acquired through the foregoing process. For example, the wireless power transmission device may supply a small amount of current to the transmission coils and may measure the inductance or impedance of the transmission coils using a detector. When the detection process has failed a certain number of times, the wireless power transmission device may not enter the ping phase until the object placed on the interface surface is removed.

In power transmission using the resonance coupling scheme, the wireless power transmission device may detect a variation in one or more of the frequency, current, and voltage of the power converter by an object in the sensing zone, thereby detecting the object.

Ping Phase

In the ping phase, the wireless power transmission device performs a process for detecting a wireless power reception device present in the sensing zone using a power control message. As compared with the detection process of the wireless power reception device using a characteristic of the wireless power signal in the selection phase, the detection process in the ping phase may be a digital ping. In the ping phase, the wireless power transmission device may form and send a wireless power signal for detecting the wireless power reception device to the wireless power reception device, may demodulate a wireless power signal modulated by the wireless power reception device, and may acquire a power control message corresponding to a response to the detection signal from the demodulated wireless power signal. The wireless power transmission device may receive the power control message corresponding to the response to the detection signal, thereby recognizing the wireless power reception device as a target of power transmission.

The detection signal formed by the wireless power transmission device in the ping phase to perform the detection process may be a wireless power signal formed by applying a power signal of a specific operating point for a certain period of time. The operating point may refer to the frequency, duty cycle, and amplitude of a voltage applied to a Tx coil. The wireless power transmission device may generate the detection signal, generated by applying the power signal of the specific operating point, for a certain period of time and may transmit the detection signal to the wireless power reception device.

To respond to the detection signal, the wireless power reception device may send a signal strength packet indicating the strength of the received power signal or a power transmission end packet to the wireless power transmission device in response to the detection signal. The strength of the power signal in the message may be used as a value representing the degree of inductive coupling or resonance coupling for power transmission between the wireless power transmission device and the wireless power reception device. For example, when power received by the wireless power reception device is less than power transmitted by the wireless power transmission device, it may be determined that coupling is low.

The wireless power transmission device may extend the digital ping to enter the identification and configuration phase. In order to receive a power control message needed in the identification and configuration phase, the wireless power transmission device may maintain the power signal of the specific operating point. When the wireless power transmission device detects no wireless power reception device to transfer power to (for example, when there is no response to the power signal), the wireless power transmission device may return to the selection phase.

Identification and Configuration Phase

In the identification and configuration phase, the wireless power transmission device may identify a selected wireless power reception device and may receive configuration information. To this end, the wireless power reception device may transmit an identification packet including a message indicating identification information. The identification packet may be configured to include version information, a manufacturer code, and a basic device identifier. The wireless power transmission device may generate a power transfer contract used for power charging with the wireless power reception device based on the identification information or the configuration information.

The power transfer contract may include limits on parameters determining power transfer characteristics in the power transfer phase. The message sent from the wireless power reception device may be configured to include information on a version of a contract for wireless power transmission, identification information on a manufacturer of the wireless power reception device, information indicating the presence or absence of an extended device ID, and a basic device ID. When the information indicating the presence or absence of the extended device ID indicates the presence of the extended device ID, an extended identification packet including the extended device ID may be additionally transmitted. When the extended device ID is used, the identification information on the manufacturer, information based on the basic device ID, and the extended device ID may be used to identify the wireless power reception device. In the identification and configuration phase, the wireless power reception device may transmit a configuration packet via a power control message. The configuration packet may include a power class, information on estimated maximum power, the number of option configuration packets, an indicator indicating a window size for average received power, and an indicator indicating a method of determining a current for a major cell of the wireless power transmission device.

Before entering the power transfer phase, the wireless power transmission device may end the identification and configuration phase in order to search for another wireless power reception device.

Power Transfer Phase

In the power transfer phase, the wireless power transmission device transmits power to a wireless power reception device. The wireless power transmission device may receive a control message from the wireless power reception device while transmitting power and may adjust characteristics of power applied to the transmission coils corresponding to the received control message.

The wireless power transmission device may receive a control error packet, a received power packet, a charge status packet, and an end power transfer packet from the wireless power reception device. The control error packet may be configured to include a message including a header indicating a control error packet and a control error value. The wireless power transmission device may adjust the power applied to the transmission coils according to the control error value. For example, the wireless power reception device may transmit the control error packet to the wireless power transmission device by setting the control error value to 0 (zero) when received power is equal to desired power, by setting the control error value to a negative value to reduce received power, and by setting the control error value to a positive value to increase received power.

In the power transfer phase, the wireless power transmission device may monitor the parameters in the power transfer contract generated based on the identification information or the configuration information. As a result of monitoring the parameters, when the wireless power transmission device violates the limits included in the power transfer contract in power transmission to the wireless power reception device, the wireless power transmission device may cancel power transmission and may return to the selection phase.

The wireless power transmission device may end the power transfer phase based on the power control message transmitted from the wireless power reception device. For example, when a battery is fully charged while the wireless power reception device charges the battery using transferred power, the wireless power reception device may transmit a power control message requesting a wireless power transmission stop to the wireless power transmission device. When the message is received, the wireless power transmission device may end wireless power transmission and may return to the selection phase.

The end power transfer packet transmitted from the wireless power reception device may be configured to include a message including an end power transfer code indicating a reason for the stop, such as a charge complete, an internal fault, an over temperature, an over voltage, an over current, a battery failure, a reconfigure, a no response, and an unknown.

Other Phases

In a calibration phase, the wireless power transmission device may improve power loss using information received from the wireless power reception device. When a satisfactory received power value is not received within a certain period of time, such as seconds, the wireless power transmission device may suspend power transmission and may return to the selection phase.

In a negotiation phase, the wireless power transmission device may receive a packet series including a request to update the power transfer contract from the wireless power reception device. The wireless power transmission device may approve or reject the request in response to the request. The wireless power transmission device may use a temporary copy of the power transfer contract in order to store an updated parameter until successfully finishing the negotiation phase.

In the power transfer phase, the wireless power reception device may transmit a power control message requesting renegotiation or a renegotiation phase in order to update the already generated power transfer contract. The wireless power reception device may transmit the message requesting the renegotiation of the power transfer contract when a power amount greater or less than a currently transmitted power amount is needed. In the renegotiation phase, upon receiving a control error packet, a received power packet, and a charge status packet, the wireless power transmission device may return to the power transfer phase.

In-band communication refers to exchanging information between a wireless power transmission device and a wireless power reception device using a frequency used for wireless power transmission. An in-band communication scheme does not require a transmission module or a reception module for separate data communication and does not require use of a separate communication frequency used for communication in these communication modules.

The wireless power reception device may further include a switch for in-band communication and may change a power amount received by the wireless power reception device using the switch to change a power amount consumed by the wireless power transmission device. The wireless power transmission device may detect the consumed power amount or a change in power to acquire state information on a load end of the wireless power reception device. For example, the wireless power transmission device may periodically block the wireless power reception device from receiving wireless power, thereby changing a wireless power amount. Since a transmission coil of the wireless power transmission device and a reception coil of the wireless power reception device have an impact on each other, when the reception coil of the wireless power reception device is blocked from the load end, a current flowing in the reception coil of the wireless power reception device is changed. This current change in the reception coil induces a current change in the transmission coil of the wireless power transmission device. Therefore, the wireless power transmission device may detect the current change in the transmission coil, thereby acquiring information including a state of the wireless power reception device and requests from the wireless power reception device. The state information may include information on the required maximum power amount, current charging amount, charging speed, and operation state (for example, temperature and overcharging information) of the wireless power reception device, and the requests may include information for adjusting wireless power or suspending wireless power transmission.

The wireless power transmission device may operate corresponding to a request from the wireless power reception device based on the acquired information, and may further include a resistor and a switch to send state information on the wireless power transmission device to the wireless power reception device. The state information on the wireless power transmission device may include information on maximum supply power amount, the number of wireless power reception devices being supplied with power from the wireless power transmission device, or the available power amount of the wireless power transmission device.

A modulator/demodulator is connected to a power reception unit and may include a resistive element with changing resistance for a DC current, and a capacitive element with changing reactant for an AC current. A power reception controller may change the resistance or reactance of the modulator/demodulator to modulate a wireless power signal received by the power reception unit.

Figure 24:
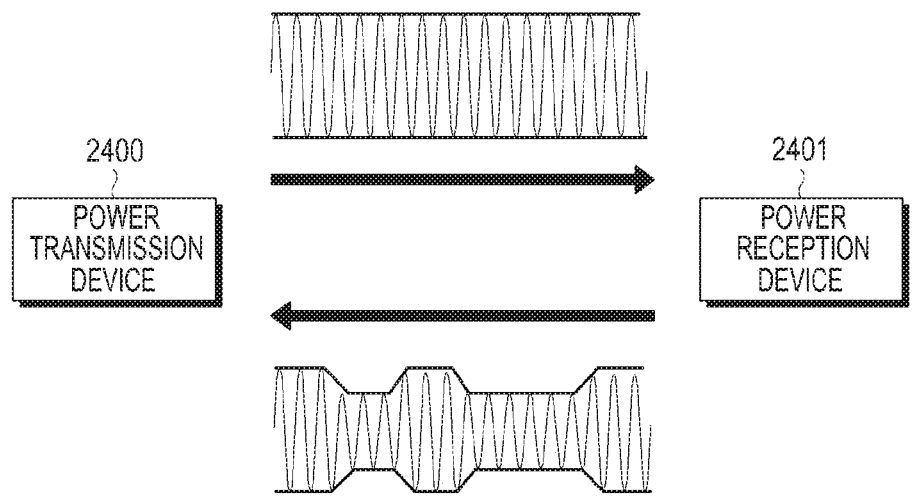
FIG. 24 illustrates that a power reception device receives power transmitted from a power transmission device and modulates a signal to send information to the power transmission device.

FIG. 24 illustrates that a power reception device 2401 receives power transmitted from a power transmission device 2400 and modulates a signal to send information to the power transmission device according to embodiments of the present disclosure. A modulation scheme, a bit encoding scheme, and a byte encoding scheme are used for modulation/demodulation.

FIGS. 25A, 25B, 25C and 25D illustrate a waveform in an in-band scheme according to embodiments of the present disclosure.

Figure 25A:
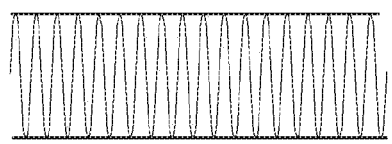
FIGS. 25A, 25B, 25C and 25D illustrate a waveform in an in-band scheme according to embodiments of the present disclosure.
Figure 25B:
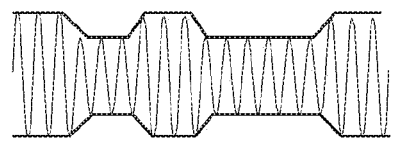
Figure 25C:
Figure 25D:

The wireless power reception device may generate communication information or charging state information based on power received through a power reception antenna (or conductive pattern). For example, as illustrated in FIG. 25A, the power reception unit of the wireless power reception device may detect a charging current from power received through the power reception antenna. As illustrated in FIG. 25B, the power reception unit may modulate the waveform of the charging current. The wireless power transmission device may detect the waveform through an antenna (or conductive pattern) as illustrated in FIG. 25C. Subsequently, the wireless power transmission device may analyze the communication information or charging state information as illustrated in FIG. 25D. According to embodiments, the wireless power reception device may adjust the pulse area of the waveform corresponding to the communication information or charging state information.

An out-of-band communication refers to communication using a separate frequency from a frequency used for a source and a target in power transmission. A communication circuit may include a communication module, such as a ZigBee module and a Bluetooth module. The communication circuit may transmit data to the target using out-of-band communication.

Out-of-band communication refers to exchanging information required for power transmission using a separate frequency band from a resonance frequency band. A wireless power transmission device and a wireless power reception device may include an out-of-band communication module to exchange information needed for power transmission. The out-of-band communication module may be installed in a power supply device, and may use a short-range communication scheme, such as Bluetooth, ZigBee, wireless LAN (WLAN), and NFC, without being limited thereto.

While the present disclosure has been described with reference to certain embodiments thereof, it will be understood by those skilled in the art that various changes in form and detail may be made therein without departing from the spirit and scope of the present disclosure as defined by the appended claims.

What is claimed is:

1. A wireless power receiver for wirelessly receiving power from a wireless power transmitter, the wireless power receiver comprising:
   a display;
   a resonator that wirelessly receives power from the wireless power transmitter;
   a communication module that performs communication with the wireless power transmitter; and
   a controller configured to:
   after transmitting a searching signal which is an advertisement signal for searching for the wireless power transmitter, transmit a power receiving unit static parameter signal comprising manufacturer information on the wireless power receiver to the wireless power transmitter through the communication module, the power receiving unit static parameter signal being different from the searching signal, wherein the manufacturer information on the wireless power receiver indicates identification information of a company which produces the wireless power receiver,
   receive, through the communication module, a client characteristic configuration descriptor (CCCD) indicating authority, which is set based on both the manufacturer information on the wireless power receiver and manufacturer information on the wireless power transmitter, over whether to allow each of at least one function of the wireless power receiver, and
   perform a function allowed for the wireless power receiver from among the at least one function based on the authority,
   wherein the CCCD indicating the authority comprises at least one handle value of the at least one function of the wireless power receiver and a flag corresponding to each of the at least one handle value,
   wherein each of the at least one handle value is greater than or equal to a generic attribute profile (GATT) primary service base handle value plus 51,
   wherein the function is a quick charging function, and
   wherein the controller is configured to:
   control the display to display a first message inquiring of a user whether a performance of the quick charging function is to be approved,
   in response to receiving a user input for approving the performance of the quick charging function from the user, transmit a first request for requesting quick charging to the wireless power transmitter through the communication module, and
   perform the quick charging function using a power transmitted from the wireless power transmitter while displaying a second message indicating that the quick charging function is being performed on the display.

2. The wireless power receiver of claim 1, wherein the controller is further configured to perform the allowed function based on a handle value corresponding to the allowed function.

3. The wireless power receiver of claim 1, wherein the controller is further configured to receive manufacturer information on the wireless power transmitter from the wireless power transmitter through the communication module.

4. The wireless power receiver of claim 3, wherein the controller is further configured to receive, through the communication module, a power transmitting unit static parameter signal comprising the manufacture information on the wireless power transmitter.

5. The wireless power receiver of claim 1, wherein the controller is further configured to transmit a signal for negotiating the authority through the communication module, and receive, through the communication module, another message indicating an authority reset by the wireless power transmitter, and performs the allowed function based on the received other message indicating reset authority.

6. A wireless power transmitter for wirelessly transmitting power to a wireless power receiver, the wireless power transmitter comprising:
   a resonator that wirelessly transmits power to the wireless power receiver;
   a communication module that performs communication with the wireless power receiver; and
   a controller configured to:
   after receiving a searching signal which is an advertisement signal for searching for the wireless power transmitter from the wireless power receiver, receive a power receiving unit static parameter signal comprising manufacturer information on the wireless power receiver from the wireless power receiver through the communication module, the power receiving unit static parameter signal being different from the searching signal, wherein the manufacturer information on the wireless power receiver indicates identification information of a company which produces the wireless power receiver, identify whether to allow each of at least one function of the wireless power receiver to be performed based on the manufacturer information on the wireless power receiver and manufacturer information on the wireless power transmitter, and transmit a client characteristic configuration descriptor (CCCD) indicating an authority over whether to allow each of the at least one function of the wireless power receiver to the wireless power receiver through the communication module, wherein the CCCD indicating the authority comprises at least one handle value of the at least one function of the wireless power receiver and a flag corresponding to each of the at least one handle value, wherein each of the at least one handle value is greater than or equal to a generic attribute profile (GATT) primary service base handle value plus 51, wherein the function is a quick charging function, and wherein the controller is configured to, in response to receiving a first request for requesting quick charging from the wireless power receiver, transmit a power corresponding to the quick charging function through the communication module.

7. The wireless power transmitter of claim 6, wherein the wireless power transmitter performs the allowed function with the wireless power receiver based on a handle value corresponding to the allowed function.

8. The wireless power transmitter of claim 6, wherein the controller is further configured to transmit manufacturer information on the wireless power transmitter to the wireless power receiver through the communication module.

9. The wireless power transmitter of claim 8, wherein the controller is further configured to transmit, through the communication module, a power transmitting unit static parameter signal comprising the manufacturer information on the wireless power transmitter.

* * * * *